(12) United States Patent
Bang et al.

(10) Patent No.: US 12,375,546 B2
(45) Date of Patent: Jul. 29, 2025

(54) ELECTRONIC DEVICE FOR TRANSMITTING PLURALITY OF MEDIA STREAMS, AND METHOD THEREFOR

(71) Applicant: Samsung Electronics Co., Ltd., Suwon-si (KR)

(72) Inventors: Hanmin Bang, Suwon-si (KR); Jeongsik In, Suwon-si (KR); Hyoksung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/467,119

(22) Filed: Sep. 14, 2023

(65) Prior Publication Data

US 2024/0007518 A1 Jan. 4, 2024

Related U.S. Application Data

(63) Continuation of application No. PCT/KR2022/003475, filed on Mar. 11, 2022.

(30) Foreign Application Priority Data

Mar. 18, 2021 (KR) .................. 10-2021-0035223

(51) Int. Cl.
*H04L 65/70* (2022.01)
*H04L 65/65* (2022.01)
*H04L 65/80* (2022.01)

(52) U.S. Cl.
CPC .............. *H04L 65/70* (2022.05); *H04L 65/65* (2022.05); *H04L 65/80* (2013.01)

(58) Field of Classification Search
CPC .......... H04L 65/70; H04L 65/65; H04L 65/80
See application file for complete search history.

(56) References Cited

U.S. PATENT DOCUMENTS 8,306,060 B2 11/2012 Ngo et al.
9,985,857 B2 5/2018 Balasubramanian et al.
(Continued)

FOREIGN PATENT DOCUMENTS

JP 2013223056 A 10/2013
KR 100678891 B1 2/2007
(Continued)

OTHER PUBLICATIONS

International Search Report for PCT/KR2022/003475 mailed Jun. 17, 2022, 3 pages.
(Continued)

*Primary Examiner* — William G Trost, IV
*Assistant Examiner* — Monishwar Mohan
(74) *Attorney, Agent, or Firm* — NIXON & VANDERHYE P.C.

(57) ABSTRACT

An electronic device may include: at least one encoder, a communication module and at least one processor operatively connected to the at least one encoder and the communication module, wherein the at least one processor may be configured to encode each media stream inputted from a plurality of media sources, so as to sequentially generate frames via at least the encoder, and form, into one integrated packet, frames designated on the basis of attributes of frames generated from different media sources of the plurality of media sources, so as to transmit the integrated packet to an external electronic device through the communication module.

12 Claims, 20 Drawing Sheets

(56) References Cited

U.S. PATENT DOCUMENTS

| | | |
|---|---|---|
| 10,021,346 B2 | 7/2018 | Oyman |
| 10,136,356 B2 | 11/2018 | Sahu et al. |
| 10,630,744 B2 | 4/2020 | Hong et al. |
| 10,694,230 B2 | 6/2020 | Park et al. |
| 2006/0023729 A1* | 2/2006 | Choi ............... H04L 65/80 370/428 |
| 2006/0199594 A1* | 9/2006 | Gundu ............. H04W 28/06 455/452.2 |
| 2012/0185907 A1* | 7/2012 | Park ............... H04N 21/242 725/110 |
| 2015/0029302 A1* | 1/2015 | Hendrickson ......... H04N 7/15 348/14.08 |
| 2015/0189328 A1* | 7/2015 | Edlis ............. H04L 65/4015 375/240.28 |
| 2015/0264103 A1 | 9/2015 | Kim et al. |
| 2015/0282072 A1* | 10/2015 | Glik ............. H04W 52/0209 455/574 |
| 2019/0238475 A1* | 8/2019 | Hegar ............... H04L 47/30 |
| 2022/0279028 A1* | 9/2022 | Modai ............. H04N 19/167 |

FOREIGN PATENT DOCUMENTS

| | | |
|---|---|---|
| KR | 100968266 B1 | 7/2010 |
| KR | 20140009315 A | 1/2014 |
| KR | 101953580 B1 | 3/2019 |
| KR | 20200045205 A | 5/2020 |
| KR | 102216125 B1 | 2/2021 |

OTHER PUBLICATIONS

Written Opinion of the ISA for PCT/KR2022/003475 mailed Jun. 17, 2022, 4 pages.

* cited by examiner

+

ELECTRONIC DEVICE FOR TRANSMITTING PLURALITY OF MEDIA STREAMS, AND METHOD THEREFOR

CROSS-REFERENCE TO RELATED APPLICATIONS

This application is a continuation of International Application No. PCT/KR2022/003475 filed on Mar. 11, 2022, designating the United States, in the Korean Intellectual Property Receiving Office, and claiming priority to KR Patent Application No. 10-2021-0035223 filed on Mar. 18, 2021, in the Korean Intellectual Property Office, the disclosures of all of which are hereby incorporated by reference herein in their entireties.

BACKGROUND

Field

Various example embodiments relate to transmission of a plurality of media streams and, for example, to an electronic device for transmitting a plurality of media streams and a method therefor.

Description of Related Art

Along with the development of digital technology, electronic devices are evolving to provide various functions. For example, electronic devices may produce and transmit a plurality of media streams from a camera, a microphone, or various input devices, in addition to communication functions such as voice call, transmission and reception of messages, and/or the wireless Internet.

Recently, hardware and/or software parts of electronic devices have been continuously improved in order to support and increase functions to produce and transmit a plurality of media streams in real time by utilizing various functions of electronic devices to support video conferencing.

SUMMARY

Various example embodiments provide a method and/or an electronic device for configuring some frames specified from a plurality of media streams into one packet in order to efficiently transmit a plurality of media streams in an electronic device.

Various example embodiments provide a method and/or an electronic device for scheduling a plurality of media stream production parameters in order to transmit a plurality of media streams in real time in an electronic device.

Technical problems to be solved are not limited to those discussed herein, and other technical problems not mentioned above may be clearly understood by those skilled in the art to which the disclosure pertains from the description below.

An electronic device according to various example embodiments may include at least one encoder, a communication module comprising communication circuitry, and at least one processor operatively connected, directly or indirectly, to the at least one encoder and the communication module, wherein the at least one processor may be configured to sequentially produce frames by encoding respective media streams input from a plurality of media sources by the encoder, configure frames of different media sources specified based on attributes of frames produced from different media sources of the plurality of media sources into one unified packet, and transmit the unified packet to an external electronic device through the communication module.

A method of an electronic device according to various example embodiments may include sequentially producing frames by encoding respective media streams input from a plurality of media sources, configuring frames of different media sources specified based on attributes of frames produced from different media sources of the plurality of media sources into one unified packet, and transmitting the one unified packet to an external electronic device.

An electronic device according to various example embodiments may configure some frames specified from a plurality of media streams into one packet and efficiently transmit the plurality of media streams.

An electronic device according to various example embodiments may configure some specified frames by scheduling parameters for producing a plurality of media streams into one packet and transmit the packet, thereby reducing transmission delay of the plurality of media streams and efficiently transmitting the plurality of media streams in real time.

In addition, various effects identified directly or indirectly through this document may be provided.

BRIEF DESCRIPTION OF DRAWINGS

In connection with the description of drawings, the same or similar reference numerals may be used for the same or similar elements. The above and other aspects, features and advantages of certain embodiments of the present disclosure will be more apparent from the following detailed description, taken in conjunction with the accompanying drawings, in which.

DETAILED DESCRIPTION

Figure 1:
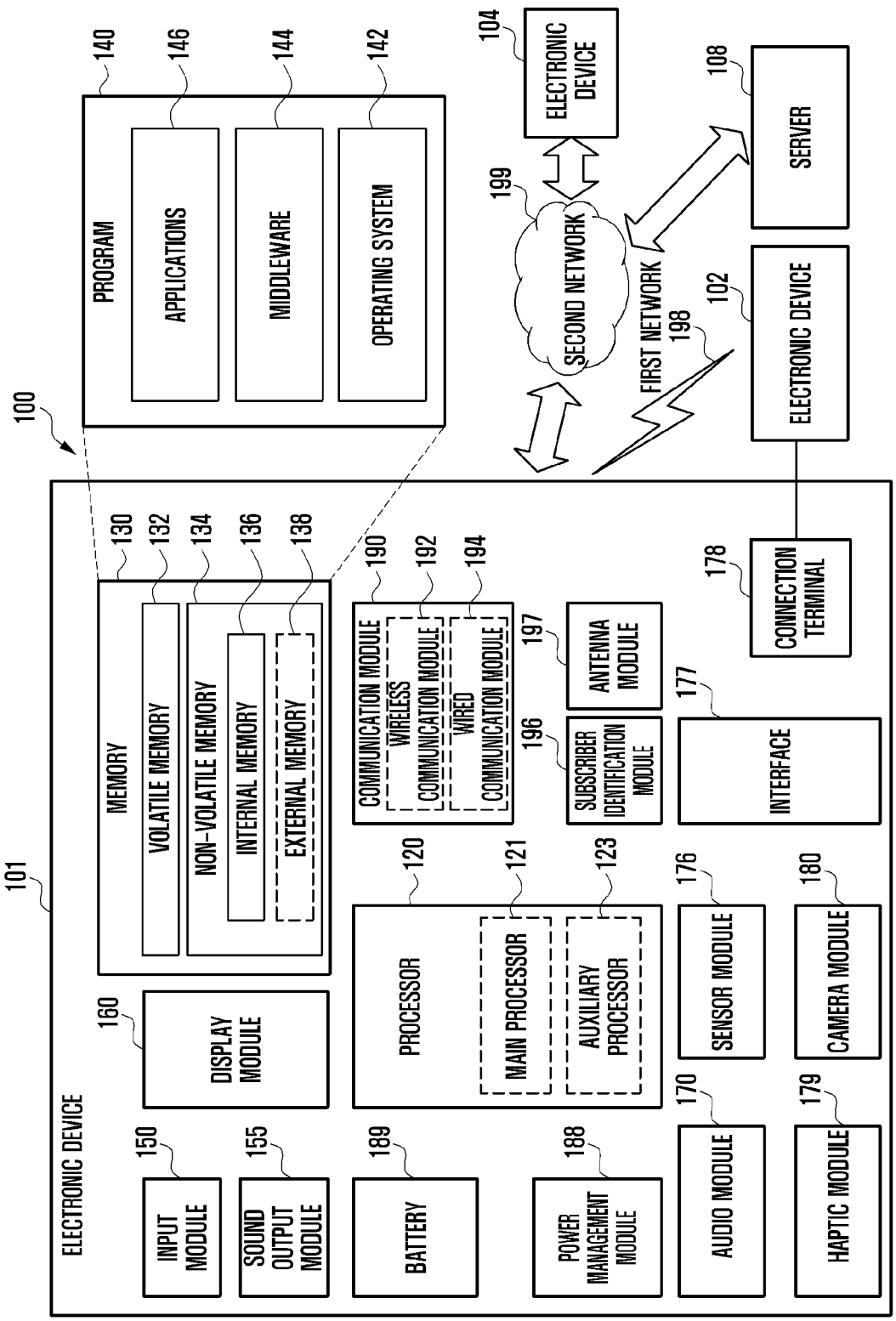
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
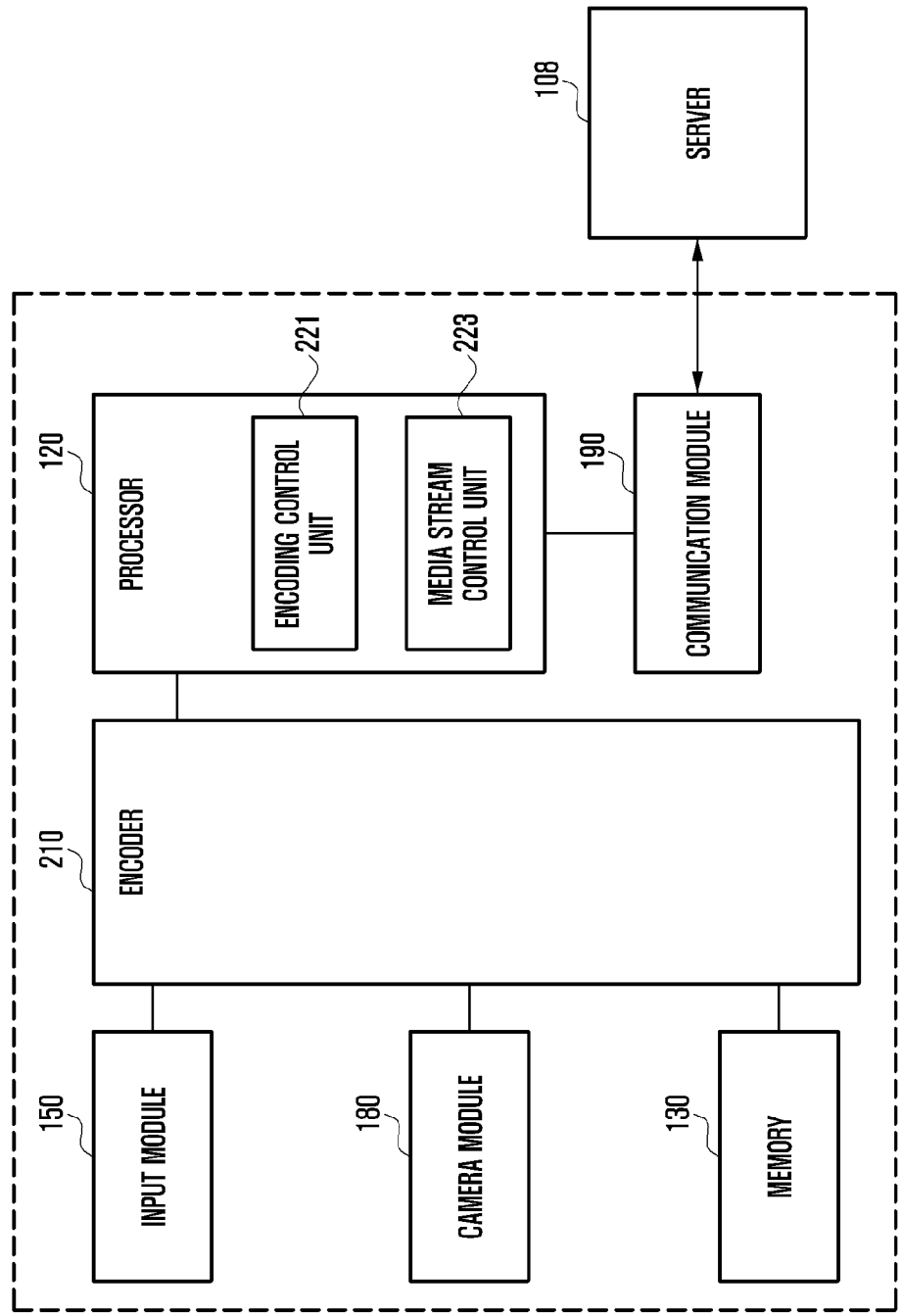
FIG. 2 is a block diagram of an electronic device according to various example embodiments.

FIG. 2 is a block diagram of an electronic device according to various embodiments.

According to various embodiments, an electronic device (e.g., the electronic device 101 in FIG. 1) may include a processor (e.g., processor 120 in FIG. 1), a memory (e.g., the memory 130 in FIG. 1), an input module (e.g., the input module 150 in FIG. 1), a communication module (e.g., the communication module 190 in FIG. 1 comprising communication circuitry) and/or an encoder 210.

According to various embodiments, the processor 120 may execute various applications requiring transmission of a plurality of media streams in real time, such as video conferencing, and thus load software (e.g., the program 140 in FIG. 1) that produces or encodes a plurality of media streams or includes a protocol for transmitting the plurality of media streams, thereby controlling at least one other element (e.g. hardware or software elements) of the electronic device 101 including the encoder 210 and the communication module 190 connected, directly or indirectly, to the processor 120, and perform processing of a variety of data or calculations.

According to an embodiment, the processor 120 may include an encoding control unit 221 and/or a media stream controller 223. According to an embodiment, the encoding control unit 221 and/or the media stream controller 223 may be configured to include hardware and/or software elements. According to an embodiment, the encoding control unit 221 and/or the media stream controller 223 may be implemented as at least some of other elements of the electronic device 101, in addition to some elements of the processor 120. For example, the encoding control unit 221 and/or the media stream controller 223 be implemented by loading the software stored in the memory 130 into the processor 120 and by the operation of at least some of other elements (e.g., the encoder 210 and the communication module 190).

According to an embodiment, the encoding control unit 221 may control the encoder 210 to encode data received from various media sources and produce frames of media streams according to configured attributes.

According to an embodiment, the encoding control unit 221 may control the encoder 210 to integrate the frames of different media streams specified based on the attributes of the frames of the media streams produced by the encoder 210, thereby configuring the same as one packet.

According to an embodiment, the media stream controller 223 may control the encoder 210 and/or the communication module 190 to respectively transmit frames of media streams produced by the encoder 210 through specified channels.

According to an embodiment, the media stream controller 223 may control the encoder 210 and/or the communication module 190 to integrate the frames of different media streams specified based on the attributes of the frames of the media streams produced by the encoder 210, thereby configuring the same as one packet, and transmit the packet through a separate channel.

According to various embodiments, the memory 130 may store software (e.g., the program 140 in FIG. 1) including a program (e.g., a video codec such as MPEG-2, H.264, or HEVC and/or an audio codec such as the Opus codec) for producing or encoding a plurality of media streams and/or a protocol (e.g., a real-time transport protocol (RTP)) for transmitting media streams. For example, the data may include input data or output data for commands related to the software described above.

According to an embodiment, the memory 130 may store various media sources including a variety of content data (e.g., still images, videos, and/or audio data) for producing a plurality of media streams.

According to various embodiments, the input module 150 may receive a variety of data for producing media streams from the outside (e.g., a user) of the electronic device 101. The input module 150 may include, for example, a microphone, a mouse, a keyboard, a key (e.g., a button), or a digital pen (e.g., a stylus pen). For example, data received through the input module 150 may be synchronized with data input from other elements (e.g., the memory 130 or the camera module 180) of the electronic device 101 to form a media stream.

According to various embodiments, the camera module 180, comprising a camera, may produce a media stream based on image signals obtained by capturing still images and moving images under the control of the processor 120.

According to various embodiments, the communication module 190 may establish a wired or wireless communication channel between the electronic device 101 and a server (e.g., the server 108 in FIG. 1) under the control of the processor 120, and support transmission of a plurality of media streams through the established communication channel.

According to various embodiments, the encoder 210 may encode media data input through various media sources (e.g., the memory 130, the input module 150, the camera module 180, and/or an interface (e.g., the interface 177 in FIG. 1)) according to configured attributes, thereby producing a plurality of media stream frames. According to an embodiment, the encoder 210 may include software and/or hardware elements and produce frames of various media streams by loading a video codec such as MPEG-2, H.264, or HEVC and/or an audio codec such as the Opus codec for producing or encoding media streams stored in the memory 130. Although the encoder 210 is illustrated as an element separate from the processor 120 in the drawing, the embodiment is not limited thereto, and the encoder 210 may be implemented as an element inside the processor 120 or may be configured to include various elements implemented in at least a part of an image signal processor inside the camera module 180, the audio module 170, the memory 130, and/or the processor 120. Hereinafter, in various embodiments, an operation of producing and/or transmitting a plurality of media streams and/or an operation of controlling the same may be performed according to operations of software and/or hardware by the encoder 210 and/or the processor 120, and these operations may be described based on the operation of functional blocks for producing and/or transmitting/receiving media streams.

Figure 3:
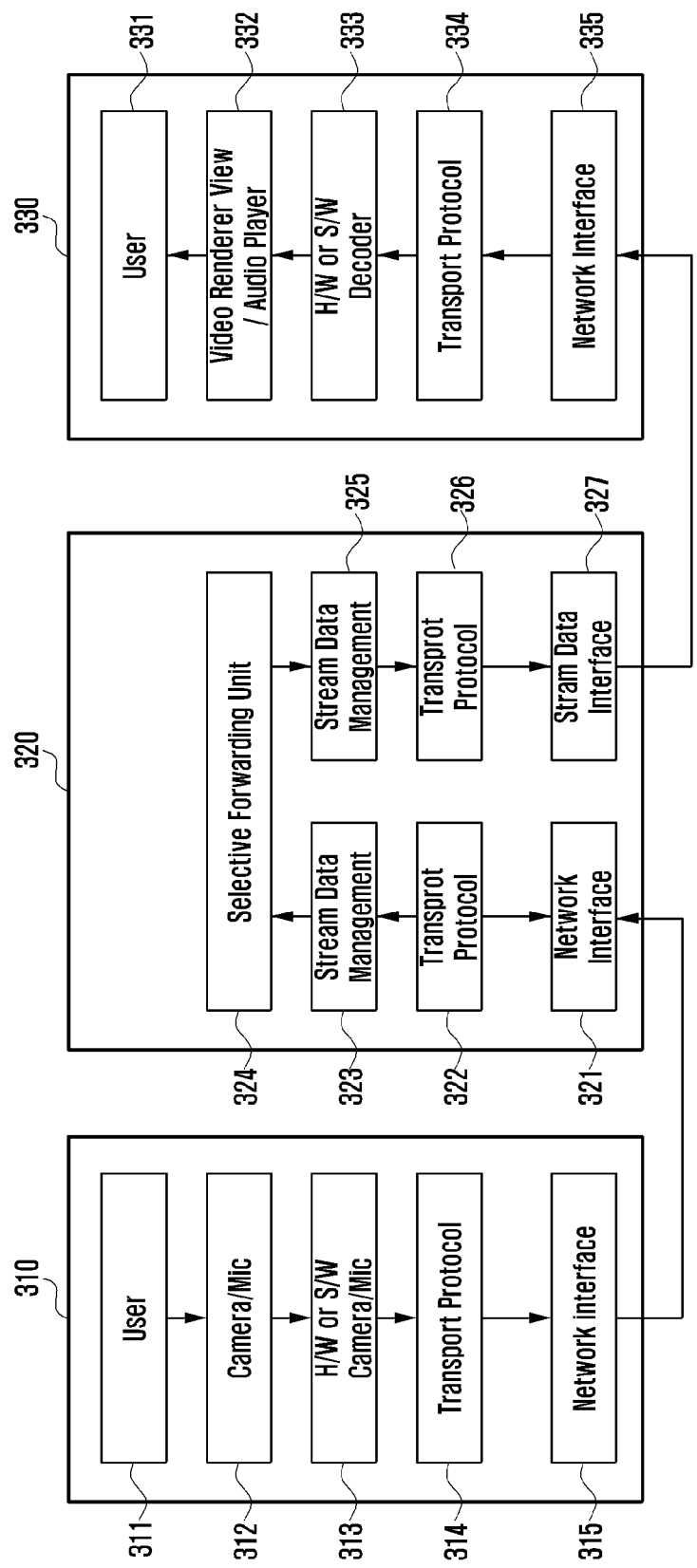
FIG. 3 is a diagram illustrating a process of transmitting/receiving a media stream according to various example embodiments.

FIG. 3 is a diagram illustrating a process of transmitting/receiving a media stream according to various embodiments. The media stream transmission/reception process in FIG. 3 may indicate a process of transmitting a video stream and/or an audio stream to another electronic device 330 (e.g., the electronic device 104 in FIG. 1) through a server 320 (e.g., the server 108 in FIG. 1 or 2) through which the electronic device 310 (e.g., the electronic device 101 in FIG. 2) provides a video conference system.

Referring to the drawing, at least one piece of media stream data may be obtained (312) from, for example, a camera (e.g., the camera module 180 in FIG. 2), a microphone (e.g., the input module 150 in FIG. 2), and/or a memory (e.g., the memory 130 in FIG. 2) according to the user input operation 311 of the electronic device 310.

According to various embodiments, at least one piece of obtained media stream data may be processed by an encoder (e.g., the encoder 210 in FIG. 2) configured as software and/or hardware to sequentially produce (314) a plurality of frames.

According to various embodiments, a plurality of frames produced by the encoder 210 may be packetized (315) into a media stream packet, based on a transport protocol, by the encoder 210 and/or a communication module (e.g., the communication module 190 in FIG. 2, comprising communication circuitry), and the packet may be transmitted (315) to a server 320 through a network interface.

According to various embodiments, the server 320 may receive (321) the media stream packet transmitted through the network interface, perform a stream data management operation (323) including analyzing, dividing, or buffering on the received packet, based on the transport protocol, and transmit (324) media stream data to another electronic device 330, based on a selective forwarding unit (SFU) described later.

According to various embodiments, the server 320 may output (325) media stream data to be transmitted to another electronic device 330, among the buffered media stream data, produce (326) a media stream packet, based on the transport protocol, and transmit (327) the same to another electronic device 330 through a network interface.

According to various embodiments, another electronic device 330 may receive (335) the media stream packet transmitted through the network interface, perform an analyzing and/or parsing operation (334) on the received packet, based on the transport protocol, perform decoding (332) on the extracted media stream data according to hardware and/or software processing operations, perform a video rendering operation on a video stream, and perform (332) an audio playback operation on an audio stream, thereby providing (331) the same to another user.

Figure 4:
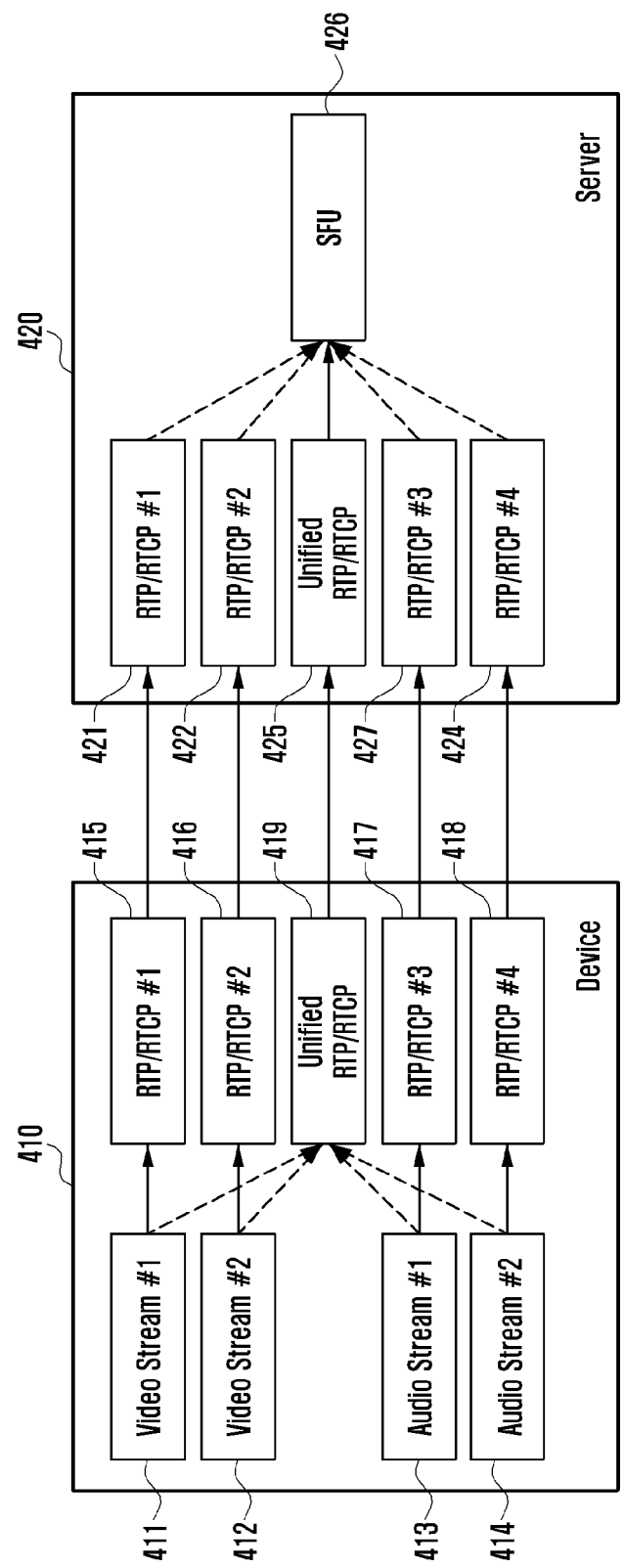
FIG. 4 is a diagram illustrating a plurality of media stream transmission channels according to various example embodiments.

FIG. 4 is a diagram illustrating a plurality of media stream transmission channels according to various embodiments. A method of transmitting/receiving a plurality of media streams based on a selective forwarding unit (SFU) will be described with reference to the drawing.

According to various embodiments, the SFU is, for example, a solution for a remote video conference and may include a method in which a plurality of participants (e.g., the electronic device 101 in FIG. 2 or the electronic device 310 in FIG. 3) transmits video data and/or audio data to a media server (e.g., the server 108 in FIG. 2 or the server 320 in FIG. 3) and selectively receives video data and/or audio data of other participants from the server 330. For example, the participant in the remote video conference may selectively request video data and/or audio data of some participants, among the video data and/or audio data transmitted from the participants to the server 320. For example, each participant may selectively listen to video data and/or audio data of other participants, and to this end, each media stream may be independently transmitted without being mixed.

According to various embodiments, the electronic device 310 may produce a plurality of media streams including a plurality of video streams 411 and/or 412 and/or a plurality of audio streams 413 and/or 414.

According to an embodiment, the electronic device 310 may independently produce a first video stream 411 and/or the second video stream 412 by an encoder (e.g., the encoder 210 in FIG. 2) using video codecs such as MPEG-2, H.264, and HEVC and transmit the same by a communication module (e.g., the communication module 190 in FIG. 2) through independent channels.

According to an embodiment, the electronic device 310 may sequentially produce video frames, for example, at intervals of 33 ms from the image data input through, for example, a camera module (e.g., the camera module 180 in FIG. 2), as a first video source, by the encoder 210 according to configured parameters, thereby outputting a first video stream 411.

According to an embodiment, the electronic device 310 may sequentially produce video frames, for example, at intervals of 33 ms from the image data input through, for example, a memory (e.g., the memory 130 in FIG. 2) and/or an input module (e.g., the input module 150 in FIG. 2) (e.g., a mouse, keyboard, buttons, or a stylus pen) as a second video source, by the encoder 210 according to configured parameters, thereby outputting a second video stream 412.

According to an embodiment, the electronic device 310 may separately produce a first audio stream 413 and/or a second audio stream 414 through the encoder 210 and/or an audio module (e.g., the audio module 170 in FIG. 1).

According to an embodiment, the electronic device 310 may extract audio data (e.g., pulse code modulation (PCM)) by sampling audio signals sequentially input through, for example, a microphone (e.g., the input module 150 in FIG. 2) using the encoder 210 and/or the audio module (e.g., the audio module 170 in FIG. 1) as a first audio source and compress the PCM data using, for example, the Opus codec to sequentially produce audio frames, for example, at intervals of 2.5, 5, 10, 20, 40, or 60 ms, thereby outputting a first audio stream 413.

According to an embodiment, the electronic device 310 may compress audio data stored in, for example, the memory 130 according to, for example, the Opus codec using the encoder 210 and/or the audio module (e.g., the audio module 170 in FIG. 1) as a second audio source to sequentially produce audio frames, for example, at intervals of 2.5, 5, 10, 20, 40, or 60 ms, thereby outputting a second audio stream 414.

According to various embodiments, the electronic device 310 may configure specified frames of different media streams, among the frames sequentially produced from a plurality of media streams including a plurality of video streams 411 and/or 412 and/or a plurality of audio streams 413 and/or 414 into one unified packet, thereby sequentially outputting unified packets and transmitting the same through an independent channel 419 (e.g., unified RTP/RTCP) using the communication module 190.

According to an embodiment, the communication module 190 of the electronic device 310 may configure each of the media streams (e.g., the first video stream 411, the second video stream 412, the first audio stream 413 and/or the second audio stream 414) into a packet and independently transmit the same through an independent channel.

According to an embodiment, the communication module 190 of the electronic device 310 may independently transmit respective media streams, based on real-time transport protocol (RTP) in order to transmit a plurality of media streams according to execution of a real-time media transmission application such as video conferencing.

According to various embodiments, RTP is a communication protocol for transmitting/receiving audio and video data over, for example, an IP network and may be used in communication or entertainment systems involving media streaming in the field of video calls including telephone, WebRTC, television services, and web-based push-to-talk functions. RTP may operate based on user datagram protocol (UDP) and may be used in combination with RTP control protocol (RTCP). For example, RTP may be used to transmit/receive media streams including audio streams and video streams, and RTCP may perform a function of monitoring transmission statistics and QoS according to RTP and complementing synchronization of a plurality of streams.

According to various embodiments, the electronic device 310 may transmit, to the server 320, time stamps (TimeStamp) of data packets periodically transmitted, the number of packets, and the amount of transmitted data (e.g., sender report (SR)).

According to various embodiments, the receiving server 320 and/or another electronic device 330 may identify information on the lost packets through a sequence number of the packet transmitted through the RTP channel and, based on this, transmit information such as a packet loss rate and the number of accumulated lost packets (e.g., receiver report (RR)) to the transmitting electronic device 310. Accordingly, the transmitting electronic device 310 may identify the feedback on the RTP channel quality through the RTCP channel.

According to various embodiments, the processor 120 of the electronic device 310 may monitor the state of a network channel through, for example, a stream controller 221 or the encoding control unit 221, and based on this, adjust the number of times the unified RTP packet is produced and/or the number of streams producing unified packets, among the different media streams.

According to an embodiment, the electronic device 310 may determine the number of media streams to be packetized and transmitted, among a plurality of media streams, in consideration of the number of lost packets transmitted through a network during transmitting the plurality of media streams, the loss ratio, the bandwidth (estimated bandwidth (RTT)), the number of packets to be transmitted, the size of data to be transmitted, and packetization time the and packet size for each packet of the media streams. For example, if the number of media streams to be unified increases when transmitting N media streams, the waiting time windows may increase, the transmission efficiency of RTP packets may increase, and the effect of loss of unified packets may increase.

According to an embodiment, the communication module 190 of the electronic device 310 may independently transmit respective media streams (e.g., the first video stream 411, the second video stream 412, the first audio stream 413, the second audio stream 414, and/or the unified media stream 419) through independent channels.

According to an embodiment, the communication module 190 of the electronic device 310 may independently transmit respective media streams, based on real-time transport protocol (RTP) in order to transmit a plurality of media streams according to execution of a real-time media transmission application such as video conferencing.

According to an embodiment, the server 320 may respectively receive the respective media streams (e.g., the first video stream 411, the second video stream 412, the first audio stream 413, the second audio stream 414 and/or the unified media stream 419) transmitted from the electronic device 310 through independent channels, for example, a first video stream 421, a second video stream 422, a first audio stream 423, a second audio stream 424, and/or a unified media stream 425 using a network interface (e.g., the network interface 321 in FIG. 3).

According to an embodiment, SFU 426 of the server 320 may analyze, divide, or buffer the respective media streams, for example, the first video stream 421, the second video stream 422, the first audio stream 423, the second audio stream 424, and/or the unified media stream 425, received based on RTP to independently manage stream data, and may selectively extract media stream data requested by another electronic device 330 and provide the requested media stream data to another electronic device 330.

Figure 5:
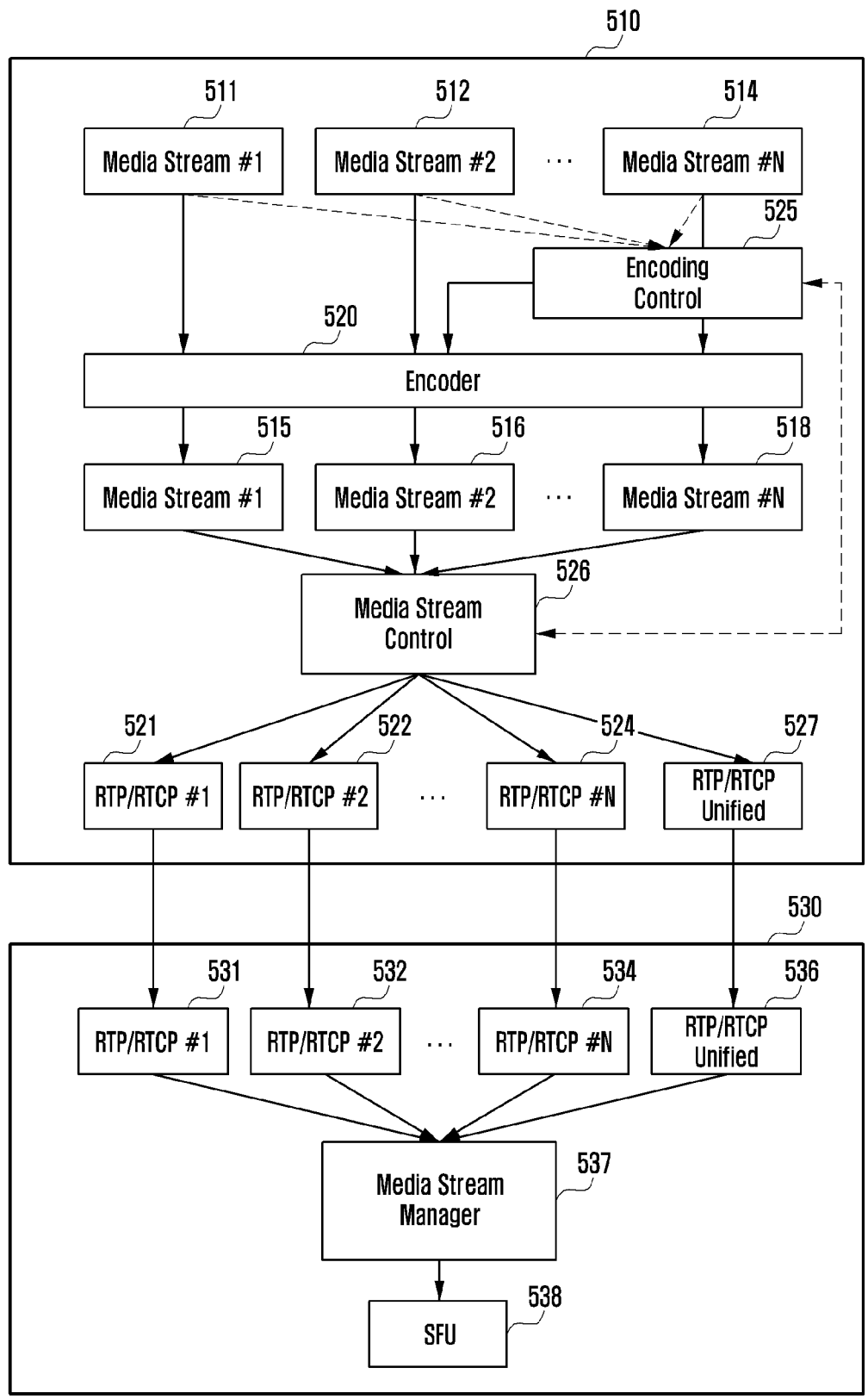
FIG. 5 is a functional block diagram illustrating an operational flow for transmitting a plurality of media streams according to various example embodiments.

FIG. 5 is a functional block diagram illustrating an operational flow for transmitting a plurality of media streams according to various embodiments.

According to various embodiments, the electronic device 510 (e.g., the electronic device 101 in FIG. 1 or 2, the electronic device 310 in FIG. 3, or the electronic device 410 in FIG. 4) may obtain a plurality of pieces of media stream data (e.g., a first media stream 511, a second media stream 512, . . . , and an Nth media stream 514) from, for example, a camera (e.g., the camera module 180 in FIG. 2), an input module (e.g., the input module 150 in FIG. 2), and/or a memory (e.g., the memory 130 in FIG. 2).

According to an embodiment, the electronic device 510 may produce frames of a plurality of media streams (e.g., first media stream frames 515, second media stream frames 516, . . . , and Nth media stream frames 518) through an encoder 520 (e.g., the encoder 210 in FIG. 2) using video codecs such as MPEG-2, H.264, and HEVC and/or audio codecs such as the Opus codec.

According to an embodiment, the electronic device 310 may schedule the production times and/or sizes of a plurality of media stream frames (e.g., the first media stream frames 515, the second media stream frames 516, . . . , and the Nth media stream frames 518) based on the plurality of pieces of media stream data (e.g., the first media stream 511, the second media stream 512, . . . , and the Nth media stream 514) by an encoding control module 525 (e.g., the encoding control unit 221 in FIG. 2).

According to an embodiment, based on the scheduling of the production times and/or sizes of the plurality of media stream frames (e.g., the first media stream frames 515, the second media stream frames 516, . . . , and the Nth media stream frames 518), the electronic device 310 may configure the plurality of media stream frames into independent media stream packets (e.g., a first media stream packet 521, a second media stream packet 522, . . . , and an Nth media stream packet 518) by the encoding control module 525 (e.g., the encoding control unit 221 in FIG. 2) and transmit the same through independent channels.

According to an embodiment, based on the scheduling of the production times and/or sizes of the plurality of media stream frames (e.g., the first media stream frames 515, the second media stream frames 516, . . . , and the Nth media stream frames 518), the electronic device 310 may configure specified frames among different media stream frames into one unified media stream packet (e.g., a unified media stream packet 527) by the encoding control module 525 (comprising processing circuitry) and transmit the same through an independent channel.

According to various embodiments, SFU 538 of a server 530 (e.g., the server 108 in FIG. 1 or 2 or the server 320 or 420 in FIG. 3 or 4) may receive a plurality of media stream packets (e.g., a first media stream packet 531, a second media stream packet 532, . . . , an Nth media stream packet 544 and/or a unified media stream packet 536) through independent channels based on RTP.

According to various embodiments, the server 530 may analyze and/or divided and store the plurality of media stream packets (e.g., the first media stream packet 531, the second media stream packet 532, . . . , the Nth media stream packet 544 and/or a the unified media stream packet 536) received through the independent channels by a media stream manager 537.

According to an embodiment, the server 530 may divide and/or extract the respective media stream frames from the unified media stream packet 536 received through the independent channel and separately buffer different media stream frames from each other in storages for storing corresponding media stream frames by the media stream manager 537.

According to various embodiments, an electronic device (e.g., the electronic device 101 in FIG. 1 or 2, the electronic device 310 in FIG. 3, the electronic device 410 in FIG. 4, or the electronic device 510 in FIG. 5) may include at least one encoder (e.g., the encoder 210 in FIG. 2 or the encoder 520 in FIG. 5), a communication module (e.g., the communication module 190 in FIG. 1 or 2), and at least one processor (e.g., the processor 120 in FIG. 1 or 2) operatively connected, directly or indirectly, to the at least one encoder and the communication module, wherein the at least one processor may be configured to sequentially produce frames by encoding respective media streams input from a plurality of media sources by the encoder, configure frames of different media sources specified based on attributes of frames produced from different media sources of the plurality of media sources into one unified packet, and transmit the unified packet to an external electronic device through the communication module.

According to various embodiments, the processor may be configured to adjust and schedule the attributes of the frames sequentially produced by the encoder.

According to various embodiments, the processor may be configured to synchronize production times of frames produced from at least two different media sources of the plurality of media sources.

According to various embodiments, at least one of sizes and types of the frames produced from at least two different video sources of the plurality of media sources may be produced differently at the same time.

According to various embodiments, the processor may be configured to configure waiting time windows, based on the production conditions of the frames produced from different media sources of the plurality of media sources, configure frames having a size less than a threshold value, based on the configured waiting time windows, into the one unified packet, and transmit the unified packet to the external electronic device through the communication module.

According to various embodiments, the processor may be configured to configure frames having a size equal to or greater than a threshold value, among the frames produced from different media sources of the plurality of media sources, into independent packets, based on the waiting time windows, and transmit the packets to an external electronic device through the communication module.

According to various embodiments, the processor may be configured to identify a transmission channel state and determine at least one of a value of the waiting time window for configuring the unified packet, the number of times the unified packet is produced, or the number of different media sources.

According to various embodiments, the processor may be configured to identify the transmission channel state, based on at least one of a packet loss rate, an accumulated packet loss rate, a bandwidth, the number of packets to be transmitted, or a packet production time.

According to various embodiments, the processor may be configured to transmit the one unified packet, based on a real-time transport protocol (RTP).

According to various embodiments, the one unified packet may be configured to include a field designating a payload size of each of the specified frames in a header.

Figure 6A:
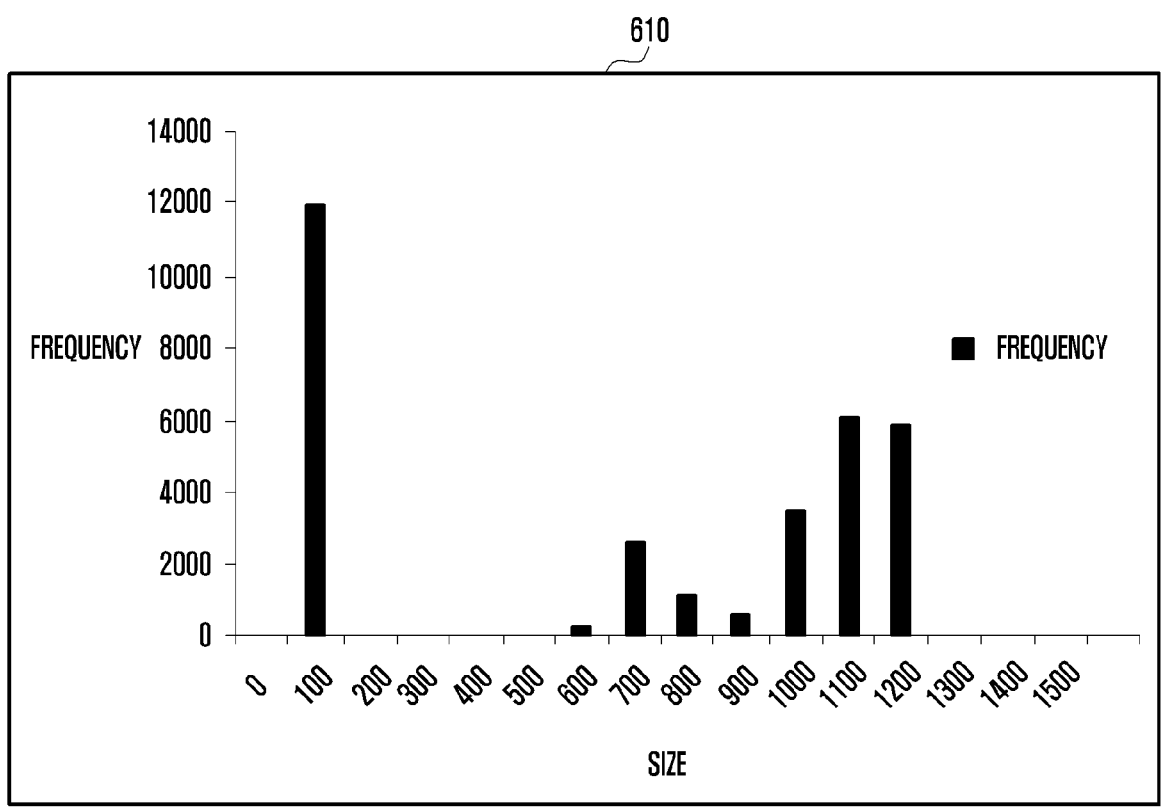
FIGS. 6A and 6B are graphs illustrating the number of media stream transmission packets, transmitted and received during a video conference, depending on the sizes thereof according to various example embodiments.
Figure 6B:
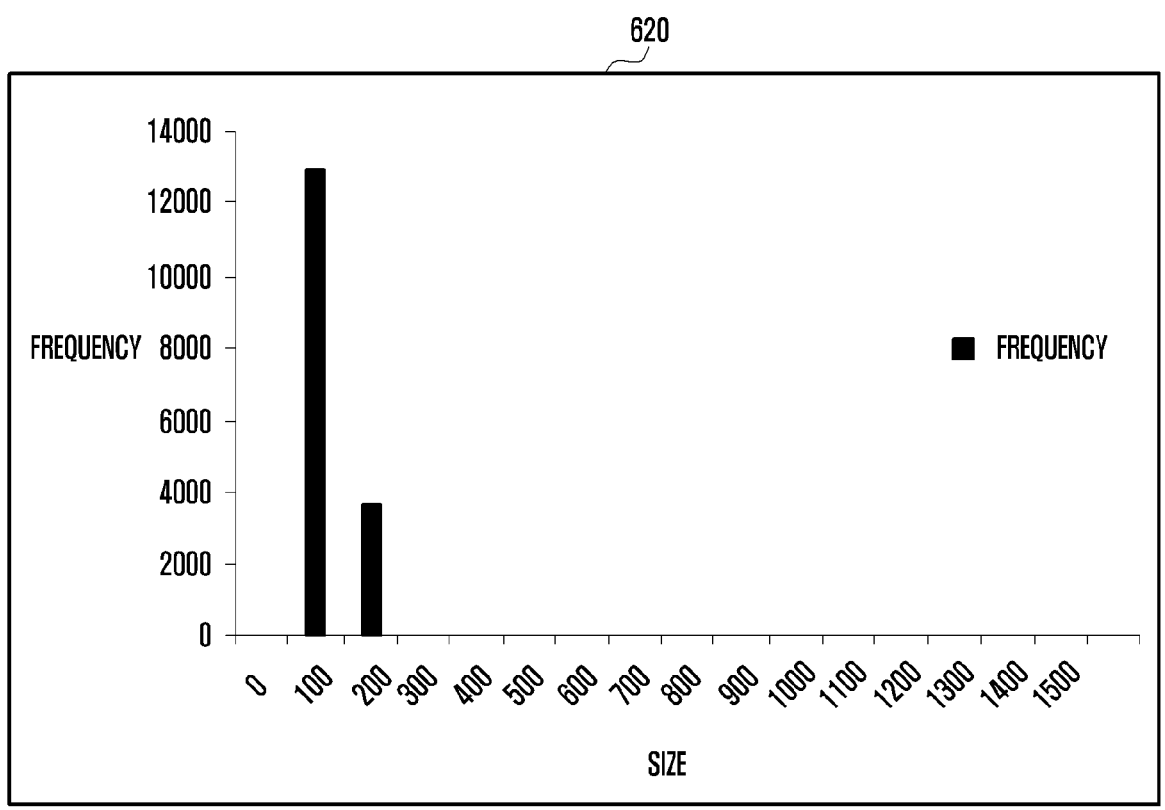

FIG. 6 shows graphs illustrating the number of media stream transmission packets, transmitted and received during a video conference, depending on the sizes thereof according to various embodiments.

FIG. 6 may show transmission patterns of a plurality of media stream packets produced according to execution of various applications requiring real-time transmission of a plurality of media streams, such as video conferencing, in an electronic device (e.g., the electronic device 101 in FIG. 1 or 2, the electronic device 310 in FIG. 3, the electronic device 410 in FIG. 4, or the electronic device 510 in FIG. 5).

According to an embodiment, in an example in which video stream are transmitted by, for example, two participants according to execution of a video conference application, referring to the graph 610 showing the size of a transmitted RTP packet, it can be seen that the number of packets having a size of 100 to 200 bytes, for example, among the 30,000 RTP packets transmitted to the server for about 2 minutes, accounts for about 37.6% of the total.

Since each packet basically includes a fixed header and since there is a fixed overhead in which a per-packet delay occurs, in general, as the maximum or large transmission unit (MTU) index of the communication protocol in a network layer, which is the size (byte) of the maximum or large protocol data unit capable of being transmitted by a corresponding layer, increases, the same packet may include more data, thereby increasing the transmission efficiency.

In general, although the MTU may be configured as 1500 Bytes, referring to the graph 610, it can be seen most of the real-time media stream data includes small packets of about 7 to 13% of the MTU. This is due to the fact that small-sized packets may be frequently transmitted for real-time transmission, that many small-sized frame packets are produced according to video codec compression, and/or that the videos transmitted by participants has little change, such as in video conferencing.

According to an embodiment, in an example of transmitting an audio stream packet when a packetization configuration time interval is 20 ms using the Opus codec by two participants according to execution of a video conference application, referring to the graph 620 showing the size of a transmitted RTP packet, it can be seen that the number of packets having a size of 100 to 200 bytes, among about 16,000 RTP packets transmitted to the server for about 2 minutes accounts for about 78.3% of the total and that the number of packets having a size of 100 to 300 bytes accounts for about 99.97% of the total. In general, compressed audio data may have a small amount of data, and in particular, in the case of applications such as video conferencing, audio may generally be configured as a single channel, and accordingly, a large number of data having a small size corresponding to 7 to 20% of the MTU of 1500 bytes may be periodically transmitted through a network according to the characteristics of real-time transmission.

Figure 7:
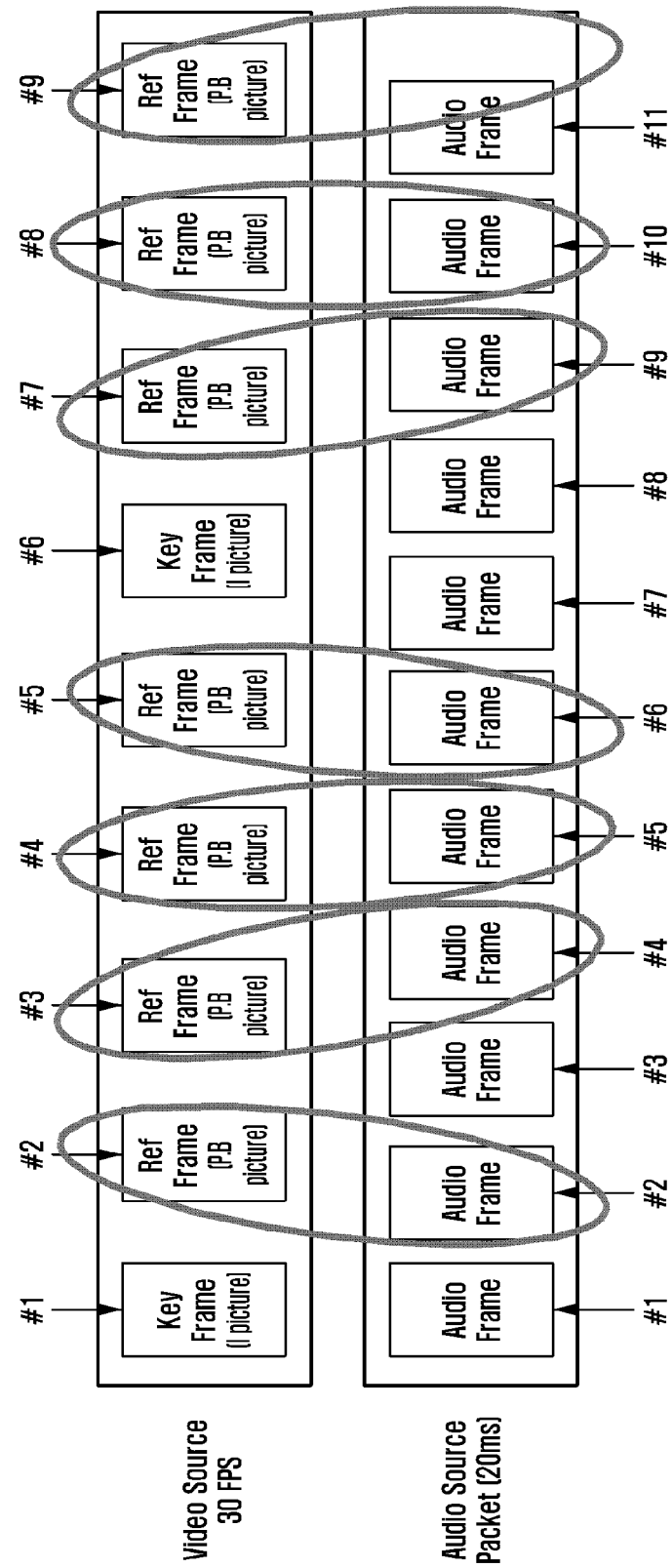
FIG. 7 is a diagram illustrating an operation of configuring some frames specified from a plurality of media streams into one packet according to various example embodiments.

FIG. 7 is a diagram illustrating an operation of configuring some frames specified from a plurality of media streams into one packet according to various embodiments.

An operation in which an electronic device (e.g., the electronic device 101 in FIG. 1 or 2, the electronic device 310 in FIG. 3, the electronic device 410 in FIG. 4, or the electronic device 510 in FIG. 5) configures frames of some different media streams specified from a plurality of media streams produced by execution of various applications, such as video conferencing, requiring real-time transmission of a plurality of media streams into one packet will be described with reference to FIG. 7.

Referring to the drawing, in the case of sequentially transmitting 100 packets at different times through, for example, one video stream and one audio stream obtained from one video source and one audio source according to execution of a video conference application, a total of 200 packets may be transmitted through the network.

According to various embodiments, at least some frames of different media streams, among the frames of the video stream and the frames of the audio stream, which are sequentially produced, may be unified to configure one unified media stream packet, respectively, according to the attributes of the frames and may be transmitted, thereby reducing the total number of transmission packets.

For example, when small-sized video frames and audio frames are combined and transmitted as one packet, the number of packet transmissions may be reduced by about 37.6% of video data packets in the example in FIG. 6. Therefore, the same data may be transmitted by transmitting a total of 163 packets using 63 (100–37) video data packets and 100 audio data packets.

According to various embodiments, a plurality of frames may be unified based on the attributes of the frames of a video stream and the frames of an audio stream, which are sequentially produced.

According to various embodiments, small-sized frames among the frames of a video stream and the frames of an audio stream, which are sequentially produced, for example, among media frames of different media sources included within a specified time range, may be configured and transmitted as one unified media stream packet, based on the production times and sizes thereof. For example, the frames of a video source may be produced at 30 frames per second (30 FPS), and the frames of an audio source may be produced in a cycle of 20 ms, and frame 12 of the video source and frame 12 of the audio source, which are frames within a specified time range, based on the production times of the frames, may be configured into one unified packet. For example, frame 13 of the video source and frame 14 of the audio source, frame 14 of the video source and frame 15 of the audio source, frame 17 of the video source and frame 19 of the audio source, frame 18 of the video source and frame 110 of the audio source, and frame 19 of the video source and frame 111 of the audio source may be configured into unified media stream packets, respectively. For example, large-sized frames among the frames of a video stream and the frames of an audio stream, which are sequentially produced, for example, frame 11 and frame 16 of the video source may be configured as independent packets and transmitted independently.

Figure 8:
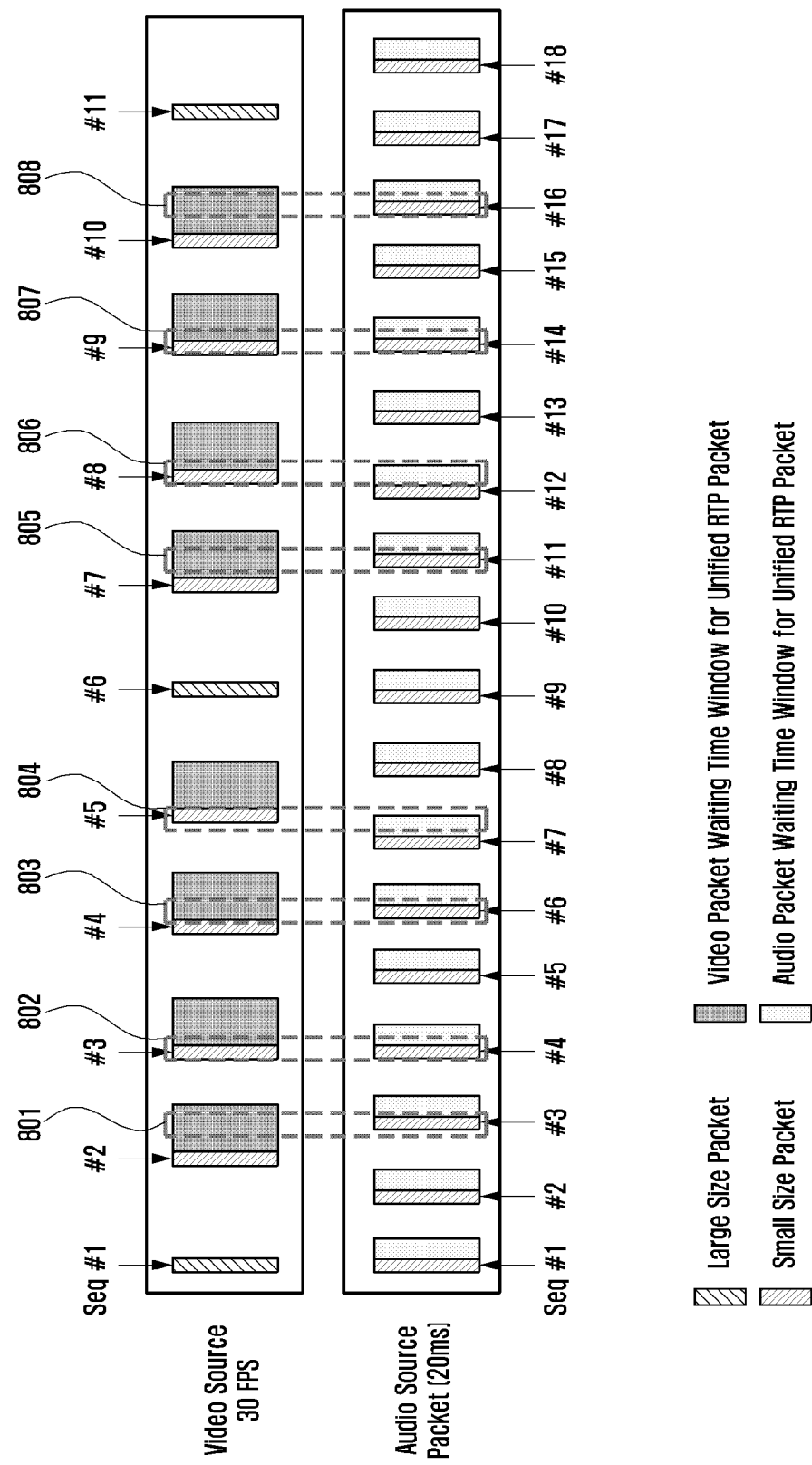
FIG. 8 is a diagram illustrating an operation of configuring some frames specified from a plurality of media streams into one packet and transmitting the same according to various example embodiments.

FIG. 8 is a diagram illustrating an operation of configuring some frames specified from a plurality of media streams into one packet and transmitting the same according to various embodiments.

An operation in which an electronic device (e.g., the electronic device 101 in FIG. 1 or 2, the electronic device 310 in FIG. 3, the electronic device 410 in FIG. 4, or the electronic device 510 in FIG. 5) configures frames of some different media streams specified based on frame production times from a plurality of media streams produced by execution of various applications, such as video conferencing, requiring real-time transmission of a plurality of media streams into one packet and transmits the same will be described with reference to FIG. 8.

According to various embodiments, the electronic device may unify a frame of one specified media stream with a frame of another media stream produced within a specified time range after the frame is produced to produce one unified packet and transmit the produced unified packet. Accordingly, the frame of one specified media stream and/or the frame of another media stream may be delayed within a maximum or large specified time range.

According to an embodiment, waiting time windows (e.g., 801 to 808) may be respectively configured for frames 12, 13, 14, 17, 18, 19, and 110 that are small-sized frames in a stream of a video source, and frames 13, 14, 16, 17, 111, 112, 114, and 116 of a stream of an audio source may be produced in the respective waiting time windows and unified with the respective corresponding video source frames waiting within a specified waiting time range so as to be configured as respective unified packets.

According to an embodiment, each unified packet may be transmitted to the server through an independent channel immediately after the unified packet is configured, or when a corresponding waiting time window ends or thereafter.

According to an embodiment, at the time of producing a large-sized packet from the video source stream (e.g., at the time of producing video frame 11), waiting may not be performed by configuring a waiting time window for RTP packet unification for the audio source stream, and accordingly, video frame 11 of the video source stream and frame 11 and frame 12 of the audio source stream may be configured as independent packets without delay and transmitted.

According to an embodiment, it can be seen that the size of a frame produced in the video stream has a constant pattern according to, for example, the encoding characteristics of the video stream among the media streams. In the example shown in FIG. 8, frame 11, frame 16, and frame 110, which are large frames of the video source, may correspond to I pictures, and the number and order of B pictures and P pictures may be regularly scheduled for the produced frames after the I picture is produced until the next I picture is produced, and based on this, respective picture frames of specified types may be regularly produced at specified times.

According to an embodiment, the electronic device may expect the type of frame to be produced and the size of the frame based thereon, according to scheduling, and if the size of the frame to be produced next in the stream of the video source is expected to be large, the waiting time windows may not be configured for the frames of other media streams so that the frames may be immediately configured and transmitted as an independent packet.

Figure 9:
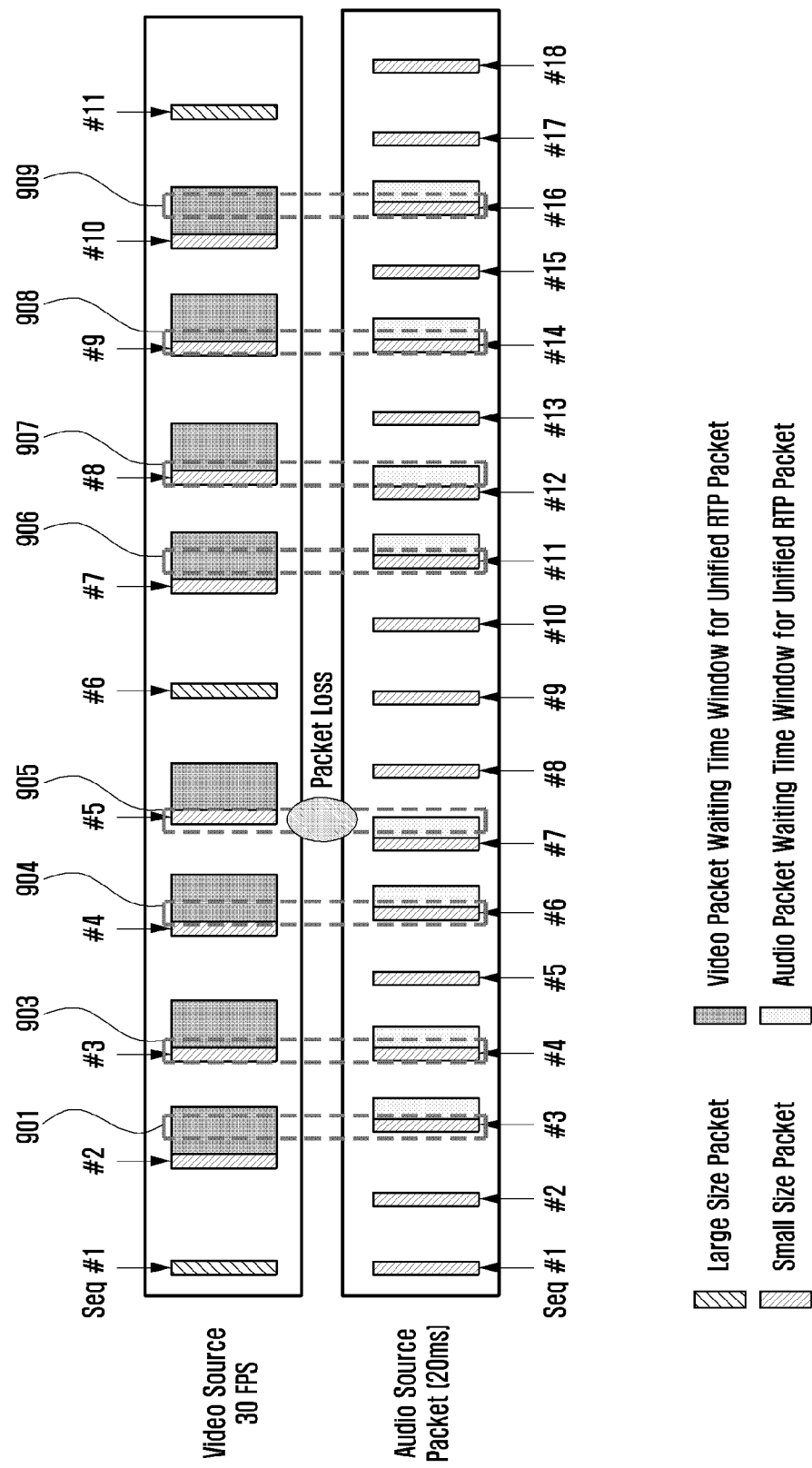
FIG. 9 is a diagram illustrating a retransmission operation due to packet loss that occurs when configuring some frames specified from a plurality of media streams into one packet and transmitting the same according to various example embodiments.

FIG. 9 is a diagram illustrating a retransmission operation due to packet loss that occurs when configuring some frames specified from a plurality of media streams into one packet and transmitting the same according to various embodiments.

A retransmission operation due to packet loss that occurs when an electronic device (e.g., the electronic device 101 in FIG. 1 or 2, the electronic device 310 in FIG. 3, the electronic device 410 in FIG. 4, or the electronic device 510 in FIG. 5) configures frames of some different media streams specified from a plurality of media streams produced by execution of various applications, such as video conferencing, requiring real-time transmission of a plurality of media streams into one packet and transmits the same will be described with reference to FIG. 9.

In general, a real-time data transmission application using UDP-based protocols may be aware of packet loss and determine whether or not retransmission of the lost packet is possible (RTT) until the time at which the lost packet is used, thereby requesting retransmission or skipping the lost packet.

According to various embodiments, as frames of different media streams specified from a plurality of media streams are transmitted as unified packets, recognition of packet loss of a media stream having a relatively long transmission cycle on the receiving side may be accelerated based on a media stream having a short transmission cycle, among the plurality of media streams.

According to various embodiments, packets of frames specified based on the size and time from among the frames produced from a plurality of media streams may be independently transmitted, and in addition, a unified media stream packet may be configured for specified frames of different media streams and separately transmitted, so that recognition of packet loss on the receiving side may be made quite early, based on the reception sequence of a plurality of media stream packets and additional unified media stream packets.

FIG. 9 may show an example in which a unified packet is lost in the state in which RTP sequence frame 15 in the video stream and RTP sequence frame 17 in the audio stream may be unified and transmitted as one unified packet.

In the case where the unified packet is not transmitted, it is possible to recognize, on the receiving side, that a packet of sequence number 5 is lost after receiving a packet of sequence number 6 in the video stream, and accordingly, it may take, for example, about 33 ms+∝ (e.g., network delay) to recognize the loss of the packet of sequence number 5.

According to various embodiments, in the case of transmitting an unified packet, a packet of sequence number 8 of the audio stream may be transmitted prior to a packet of sequence number 6 of the video stream, and the receiving side may identify that a packet of sequence number 7 of the audio stream has not been received in the case of receiving the packet of sequence number 8 of the audio stream, so that the receiving side may request retransmission of the packet of sequence number 7. Accordingly, the transmitting side may retransmit a corresponding unified packet, based on history information stating that the packet of sequence number 7 of the audio stream and the packet of sequence number 5 of the video stream have been transmitted as one unified packet.

Figure 10:
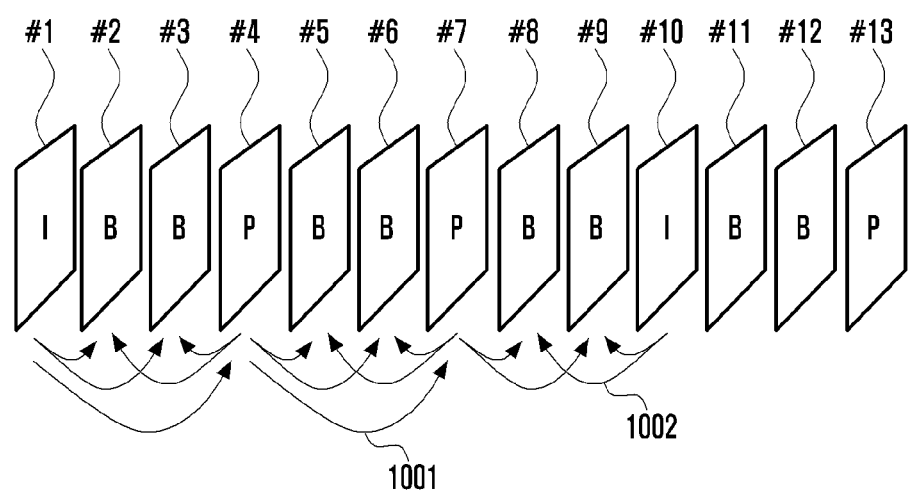
FIG. 10 is a diagram illustrating the characteristics of image frames produced according to video encoding according to various example embodiments.

FIG. 10 is a diagram illustrating the characteristics of image frames produced according to video encoding according to various embodiments.

In general, a video codec such as MPEG-2, H.264, or HEVC is a technique used to reduce the amount of information and deterioration of image quality by efficiently compressing continuously obtained images, which may remove redundant information using, for example, spatial and temporal locality and may compress respective obtained images of image sources according thereto into intra-coded picture (I), predicted picture (P), and bidirectional predicted picture (B) types of frames, respectively. Here, the I picture may be a picture that is the same compression technique as JPG and contains all information existing in an image, the P picture may be a picture having a prediction value through unidirectional prediction after the I picture, and the B picture may be a picture selectively having less data among bidirectional prediction values. Accordingly, the amount of data for each picture may be the largest in the I picture, followed by the P picture and the B picture in sequence.

The group of pictures (GOP) shown in FIG. 10 may indicate the number of picture frames after a key picture (e.g., an I picture) is produced until the next key picture is produced when compressing and encoding moving images using a video codec, and in the example of the drawing, it can be seen that frames are produced in the order of IBBPBBPBB and then next IBBP picture frames are produced. Here, the frames of "IBBPBBPBB", that is, a frame unit between production of an I frame and production of the next I frame may be referred to as a GOP, and the number of frames constituting the GOP and the frequency of production of I frames may be adjusted by configuring parameter values when performing encoding.

According to an embodiment, the frame rate of a video may also be determined when encoding the video. For example, the frame rate of a video may be configured by changing the options thereof depending on the purpose of using the video or a bandwidth of a transmission medium. For example, 15 fps or 24 fps may be mainly used in the case where a high-quality image is not required, such as in a video conference, and 24 fps or 30 fps may be mainly used for content such as a movie. As the frame rate increases, the inter-frame interval or period of a video becomes shorter, and for example, the inter-frame interval or period may be 33.33 ms/16.67 ms in the case of 30 fps/60 fps.

According to an embodiment, the electronic device may identify the production time of the I picture through the size of the GOP and the frame rate. For example, if the size of the GOP is 15 and if the frame rate is 30 fps, I pictures may be produced every 0.5 second.

FIGS. 11A to 11D are diagrams illustrating an operation of configuring frame production parameters of a plurality of video source media streams according to various embodiments.

Referring to FIGS. 11A to 11D, an electronic device (e.g., the electronic device 101 in FIG. 1 or 2, the electronic device 310 in FIG. 3, the electronic device 410 in FIG. 4, or the electronic device 510 in FIG. 5) may schedule a video frame production time and/or the type and/or size of a produced frame of at least one video source among a plurality of media streams in order to increase transmission efficiency according to production and transmission of an unified packet for a plurality of media streams.

Figure 11A:
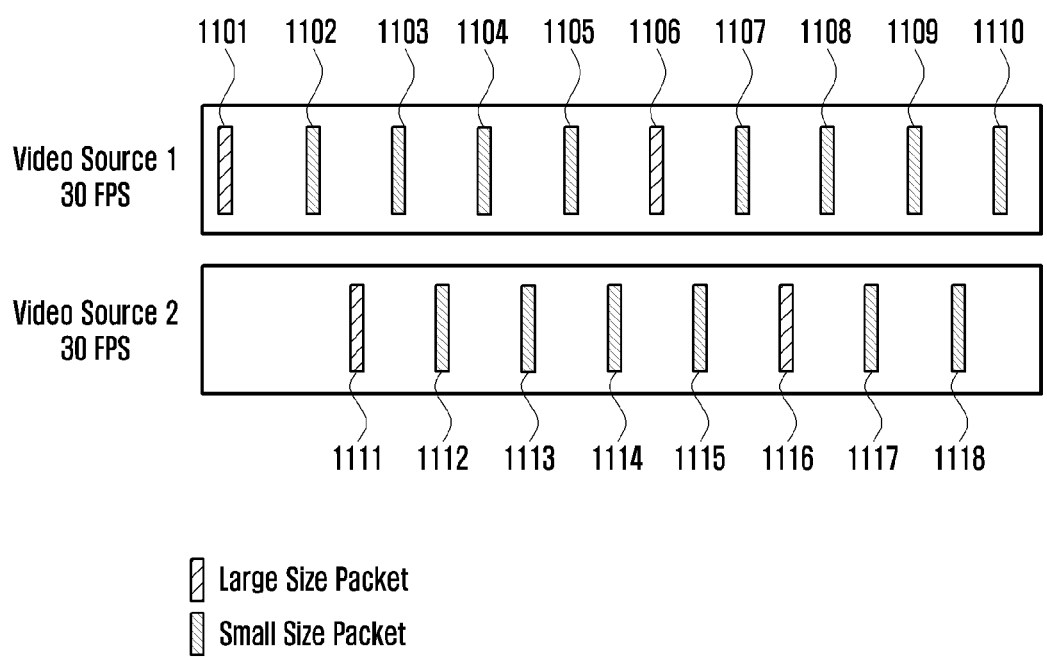
FIGS. 11A to 11D are diagrams illustrating an operation of configuring frame production parameters of a plurality of video media streams according to various example embodiments.

Referring to FIG. 11A, production times of frames (a first frame 1101 to a tenth frame 1110) of a stream of a first video source do not match production times of frames (a first frame 1111 to an eighth frame 1118) of a stream of a second video source. In this case, when configuring and transmitting an unified packet by unifying RTP packets according to various embodiments in order to increase the transmission efficiency of RTP packets, the waiting time window must be configured to be larger to the extent of the mismatch in the production time between the frames of the respective video sources, and thus a time delay occurs in each frame.

According to various embodiments, frame production times may be synchronized between the media streams of different media sources.

According to an embodiment, the electronic device may adjust and configure (schedule) parameters for encoding media stream frames and the production time of the encoder by a processor (e.g., the processor 120 in FIG. 2), an encoder (e.g., the encoder 210 in FIG. 2 or the encoder 520 in FIG. 5), the encoding control unit 221 in FIG. 2, and/or the encoding control module 525 (comprising processing circuitry) in FIG. 5, thereby synchronizing the frame production times of a plurality of media streams.

Figure 11B:
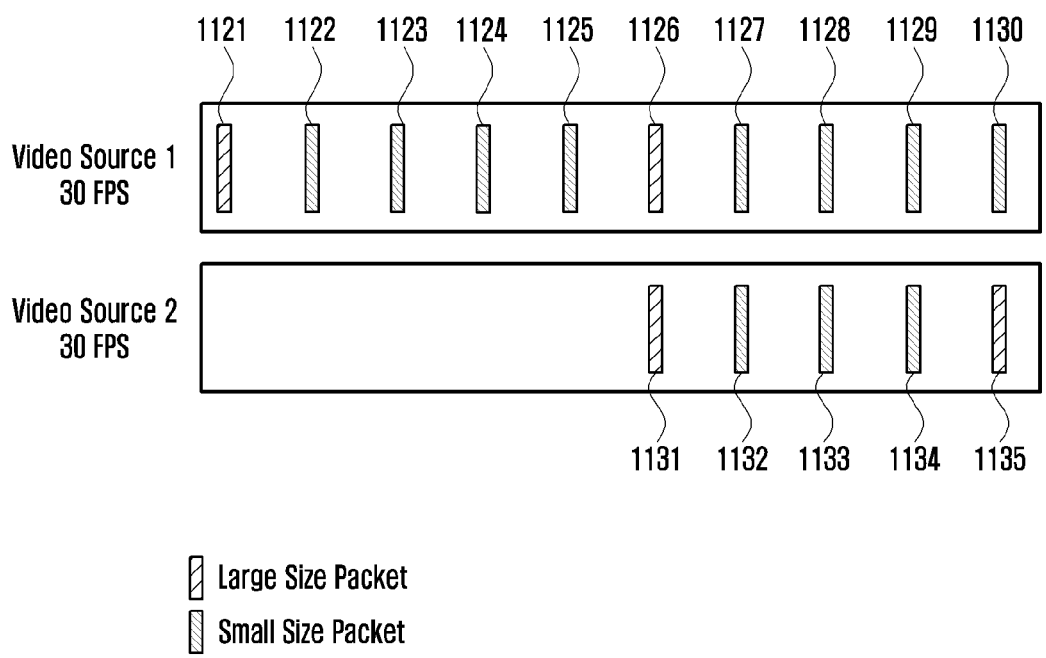

Referring to FIG. 11B, it can be seen that production times of frames (a first frame 1121 to a tenth frame 1130) of a stream of a first video source and production times of frames (a first frame 1131 to a fifth frame 1135) of a stream of a second video source are synchronized to match each other. For example, a stream of a subsequent second video source may be produced while a frame of a stream of a preceding first video source is produced, and in this case, the parameters of the encoder may be configured and scheduled such that the frame production time of the stream of the subsequent second video source matches the frame production time of the preceding first video source. Accordingly, a waiting time window between different produced media streams may be configured to be smaller.

According to an embodiment, a packet may be configured and immediately transmitted independently of other media streams, instead of applying a waiting time window, at the time of producing the I picture, whereas since the B or P picture type frame has a small amount of data, it may be unified and transmitted with B or P picture frames of media streams of other video sources produced at the same time.

Figure 11C:
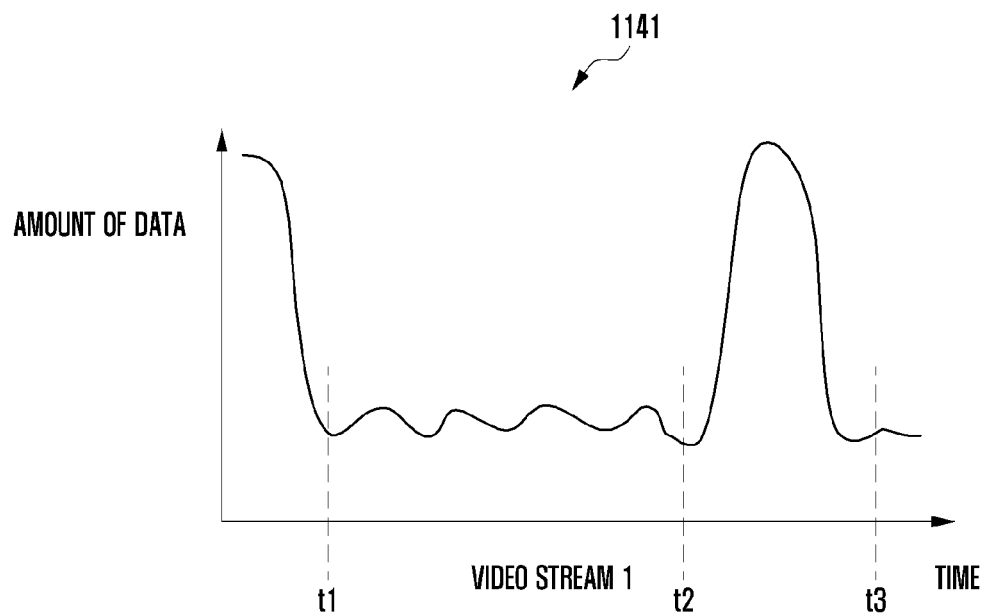
Figure 11C:
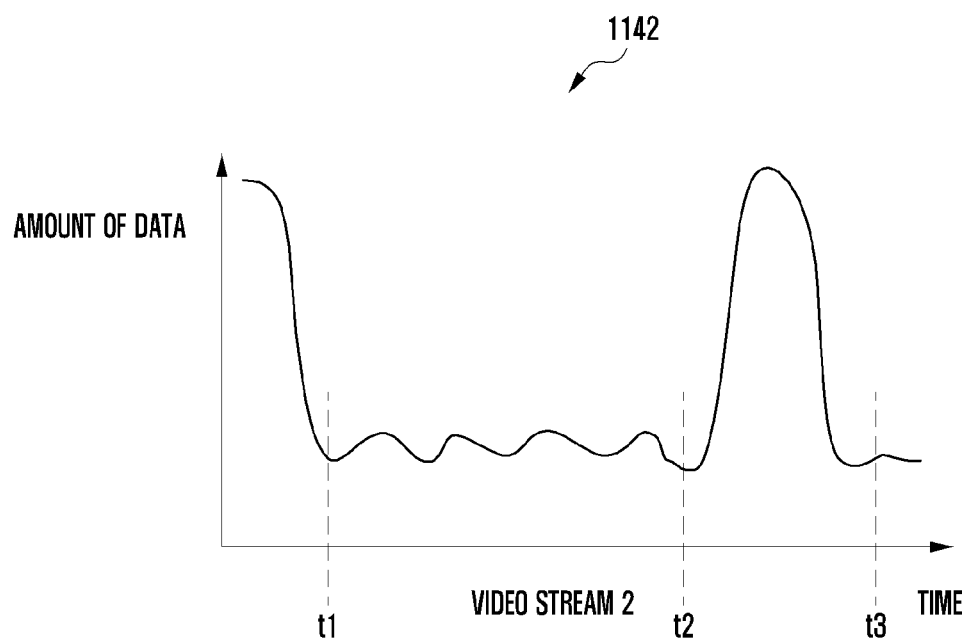

Referring to FIG. 11C, as shown in FIG. 11B, it can be seen that the amount of transmitted data 1141 of a first video source stream and the amount of transmitted data 1142 of a second video source stream exhibit the same pattern over time according to the synchronization of production times between the stream of the first video source and the stream of the second video source. For example, it can be seen that both the amount of data 1141 of the first video source stream and the amount of data 1142 of the second video source stream are reduced between time t1 and time t2 and increase between time t2 and time t3.

Referring to FIG. 11C, in the case where a media stream of a video source compression-encoded by an encoder is produced, it may be produced as a frame type is determined as the I, B, or P picture type as described above, and in the case of the I picture having a large amount of data, the amount of transmission data at the production time may be larger than that of other picture types. Accordingly, if the frame production times of the I pictures overlap between media streams of different video sources, the amount of data transmission at that time may significantly increase.

According to various embodiments, in order to increase data transmission efficiency according to transmission of unified packets, an electronic device may configure (schedule) and adjust parameters for encoding media stream frames by the encoder so that different types of frames may be produced for the frames of different media streams among the frames of a plurality of media streams at the same time.

Figure 11D:
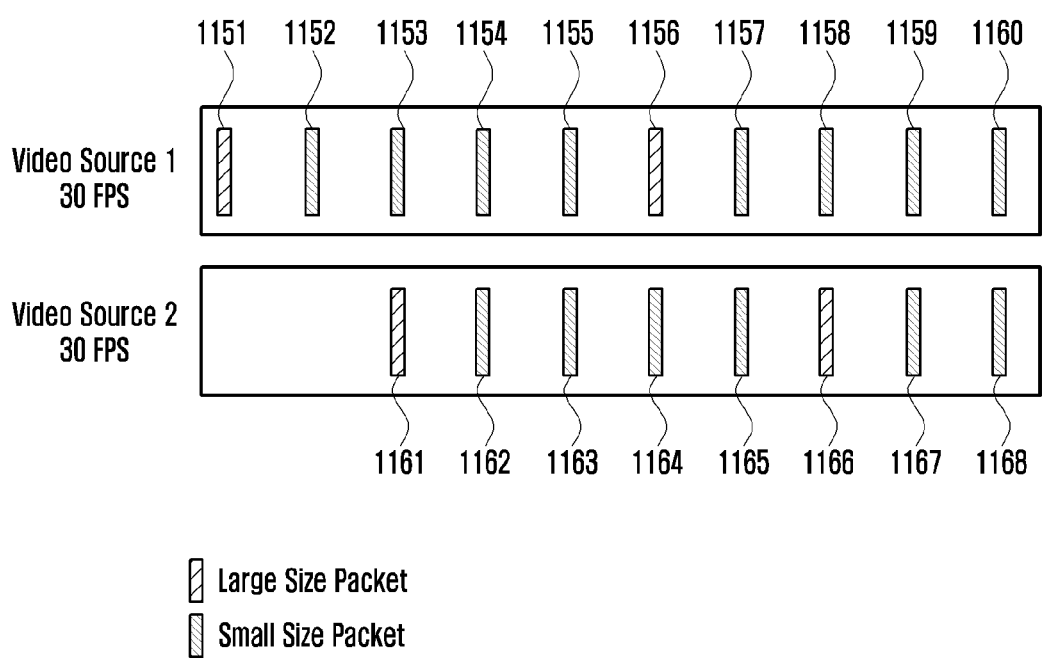

Referring to FIG. 11D, adjusting and configuring parameters of the encoder of an electronic device makes it possible to schedule the size and/or type of the frame, as well as the production time of the produced media stream.

According to an embodiment, parameters of the encoder for producing frames may be adjusted and configured such that production times of large data frames do not overlap between different media streams. For example, it can be seen that the production times of different media streams are synchronized to be the same between the frames (e.g., a first frame 1151 to a tenth frame 1160) of a first video source media stream and the frames (e.g., a first frame 1161 to an eighth frame 1168) of a second video source media stream, and that the production times of the I picture frames (e.g., a first frame 1151 and a sixth frame 1156) of the media stream of the first video source and the I picture frames (e.g., a first frame 1161 and a sixth frame 1166) of the media stream of the second video source are configured to be different from each other so as not to overlap. Accordingly, as many frames of different media streams as possible may be unified and transmitted.

Figure 12A:
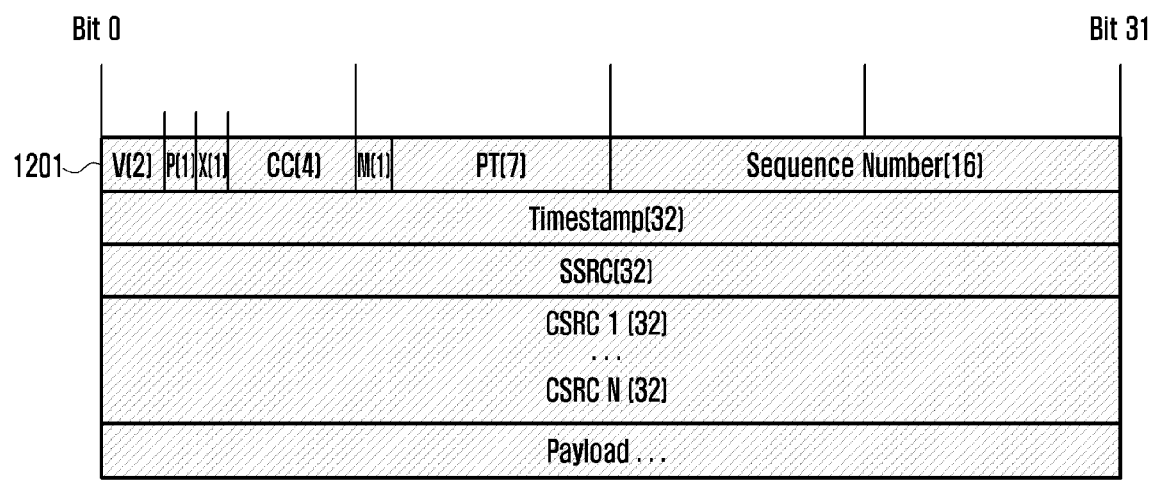
FIGS. 12A and 12B are diagrams illustrating a structure of an unified packet configured to include some frames specified from a plurality of media streams according to various example embodiments.
Figure 12B:
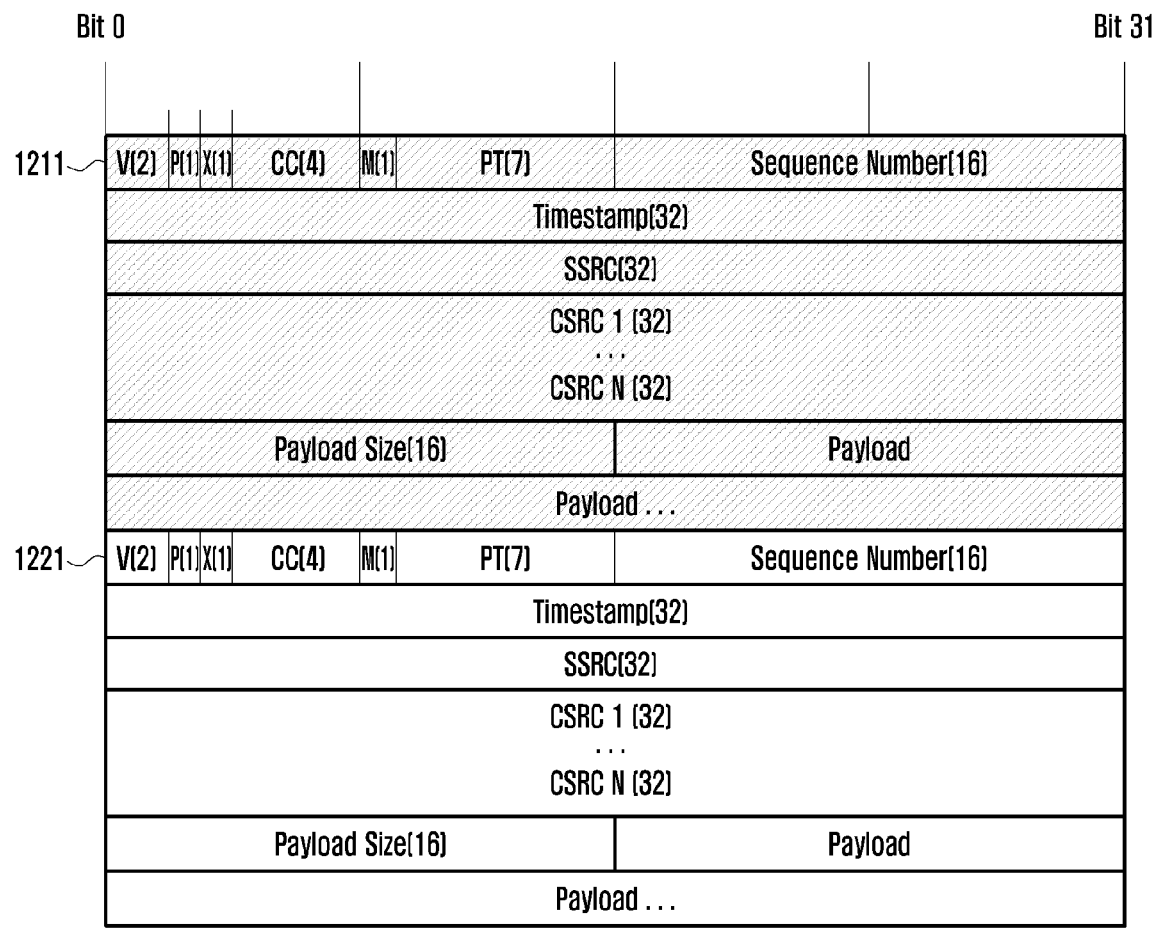

FIGS. 12A and 12B are diagrams illustrating a structure of an unified packet configured to include some frames specified from a plurality of media streams according to various embodiments.

Referring to FIG. 12A, as shown in the RTP packet, a packet header may include a protocol version in a version (2 bits) field (current default value is 2), padding in a P (1 bit) field, extension or non-extension in an X (1 bit) field, a CSRC Count value in a CC (4 bits) field, a Marker value of M (1 bit) indicating that the current data has application-specific characteristics, a payload type in a PT (payload type) (7 bits), a sequence number in a sequence number (16 bits) field, Timestamp (32 bits), Synchronization SouRCe (SSRC) (32 bits), and Contributor SouRCe (CSRC) (each 32 bits, optional), and the header size may be 12 bytes.

Referring to FIG. 12B, an unified packet according to various embodiments may be produced by unifying and recombining a plurality of packets into one packet. For example, a structure in which a second packet 1221 is added and mounted to the payload in addition to a first packet 1211 of the unified packet may be included.

According to various embodiments, since a plurality of RTP packets is unified to configure one packet, the size of each RTP packet may be recognized by specifying the data size of each payload of the RTP packet using at least one field (e.g., payload size (16)) of the extension header.

Figure 13:
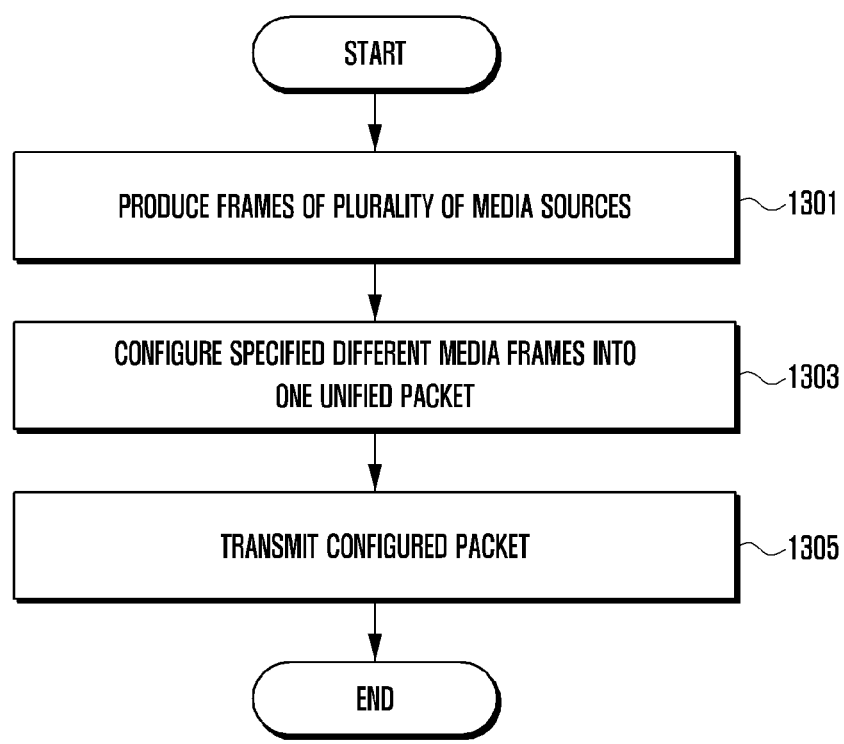
FIG. 13 is a flowchart illustrating a method of transmitting a plurality of media streams according to various example embodiments.

FIG. 13 is a flowchart illustrating a method of transmitting a plurality of media streams according to various embodiments.

FIG. 13 may show a method in which an electronic device (e.g., the electronic device 101 in FIG. 1 or 2, the electronic device 310 in FIG. 3, the electronic device 410 in FIG. 4, or the electronic device 510 in FIG. 5) produces a plurality of media frames according to execution of various applications requiring real-time transmission of a plurality of media streams, such as video conferencing, and transmits the same to an external electronic device (e.g., the server 108 in FIG. 1 or 2, the server 320 in FIG. 3, the server 420 in FIG. 4, or the server 530 in FIG.

According to various embodiments, a processor (e.g., the processor 120 in FIG. 1 or 2, comprising processing circuitry) may control an encoder (e.g., the encoder 210 in FIG. 2, the encoder 313 in FIG. 3, or the encoder 520 in FIG. 5) for encoding respective media streams input from a plurality of media sources to produce frames of a plurality of media streams in operation 1301, and configure frames of different media sources specified based on the attributes of the frames produced from different media sources of the plurality of media sources described above into one unified packet in operation 1303.

According to various embodiments, in operation 1301 described above, the processor of the electronic device may control the encoder to adjust the attributes of the respective produced frames. According to various embodiments, in operation 1305, the processor may transmit one configured unified packet to the server.

Figure 14:
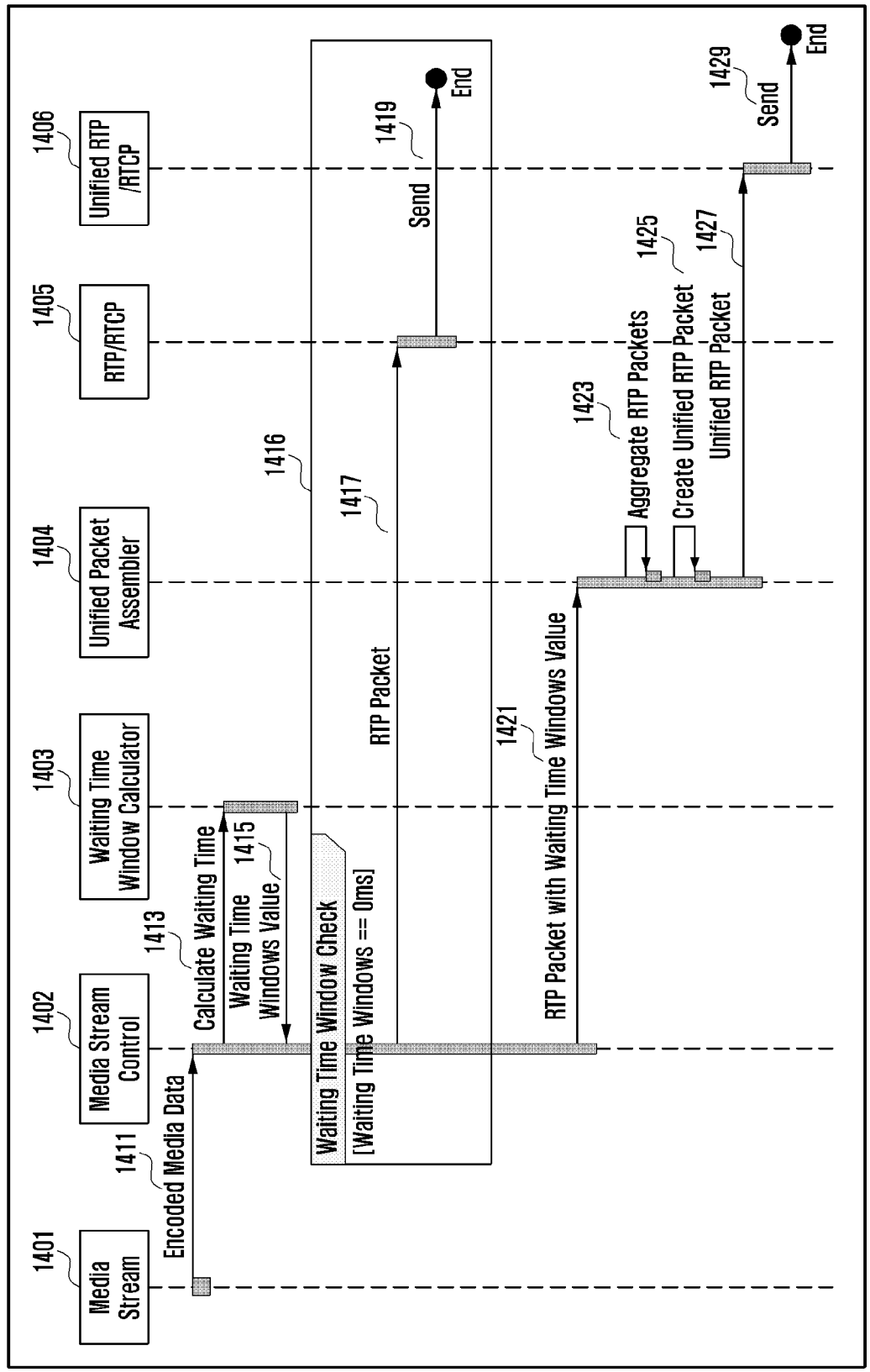
FIG. 14 is a signal flowchart illustrating an example of an operation of producing and transmitting a plurality of media streams by an electronic device according to various example embodiments.

FIG. 14 is a signal flowchart illustrating an example of an operation of producing and transmitting a plurality of media streams by an electronic device according to various embodiments.

According to various embodiments, a media stream frame 1401 produced by an encoder (e.g., the encoder 210 in FIG. 2, the encoder 313 in FIG. 3, or the encoder 520 in FIG. 5) in an electronic device (e.g., the electronic device 101 in FIG. 1 or 2, the electronic device 310 in FIG. 3, the electronic device 410 in FIG. 4, or the electronic device 510 in FIG. 5) may be input to a media stream manager 1402 in operation 1411.

According to various embodiments, a waiting time windows calculator 1403 may determine whether or not waiting time windows are required to be configured for the input data stream frame 1411 in operation 1413. According to an embodiment, to this end, the waiting time windows calculator 1403 may request a waiting time windows value from a media stream control 1402 in operation 1415.

According to various embodiments, if the waiting time windows calculator 1403 determines a packet to be a large packet that is to be transmitted immediately, the packet may be transmitted to an RTP/RTCP channel 1405 in operation 1417 and immediately transmitted in operation 1419.

According to various embodiments, if the waiting time windows calculator 1403 determines a packet to be transmitted with a delay corresponding to a waiting time windows value 1421, a unified packet assembler 1404 may configure one unified RTP packet (1425) by aggregating specified RTP packets (1423) and transmit the configured unified RTP packet to a unified RTP/RTCP channel 1406 in operation 1427, thereby transmitting the same to the server (1429).

Figure 15:
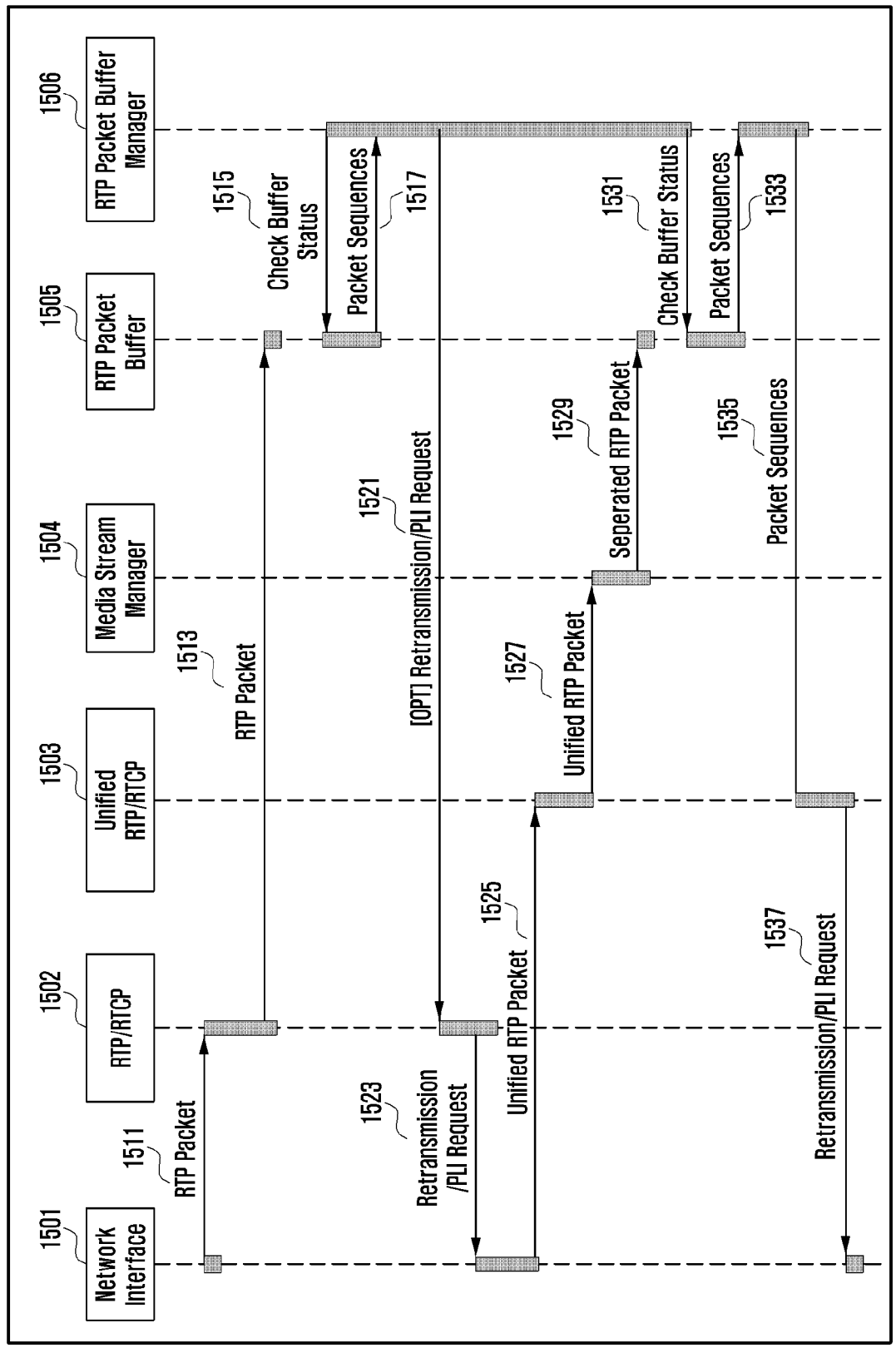
FIG. 15 is a signal flow diagram illustrating an example of an operation of receiving and storing a plurality of media streams by a server according to various example embodiments.

FIG. 15 is a signal flow diagram illustrating an example of an operation of receiving and storing a plurality of media streams by a server according to various embodiments.

Referring to FIG. 15, a server (e.g., the server 108 in FIG. 1 or 2, the server 320 in FIG. 3, the server 420 in FIG. 4, or the server 530 in FIG. 5) may receive and manage a plurality of media streams according to various embodiments.

According to various embodiments, the server may receive RTP packets of respective media streams of a plurality of media streams through a network interface 1501.

According to various embodiments, upon receiving an RTP packet corresponding to one media stream through an RTP/RTCP channel 1502 (1511), a media stream manager 1504 may transmit the same an RTP packet buffer 1505 in operation 1513.

According to various embodiments, an RTP packet buffer manager 1506 may periodically check the state of the buffer 1505 in operation 1515, identify a packet sequence number in operation 1517, and, if packet loss occurs, request retransmission through the RTP/RTCP channel 1502 in operation 1521, thereby requesting retransmission from the transmitting side through the network interface 1501 (1523).

According to various embodiments, upon receiving a unified packet (unified RTP packet) configured by unifying a plurality of different media streams through a unified RTP/RTCP channel 1503 (1525), the media stream manager 1504 may divide the unified RTP packet input into respective packets and transmit the packets to the buffer 1505 in operation 1527.

According to various embodiments, the RTP packet buffer manager 1506 may periodically check the state of the buffer 1505 in operation 1531, identify a packet sequence number in operation 1533, and, if packet loss occurs, request retransmission through the unified RTP/RTCP channel 1503 in operation 1535, thereby requesting retransmission from the transmitting side through the network interface 1501 (1537).

According to an embodiment, the packets divided from the unified packet, among the packets to be stored in the buffer 1505, may be configured with a flag indicating that the corresponding packet is a packet divided from the unified packet.

According to an embodiment, when packet loss occurs, the RTP packet buffer manager 1506 may determine whether to transmit a retransmission request to the RTP/RTCP channel 1502 or the RTP/RTCP channel 1504, based on the above flag.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A method of an electronic device, the method comprising:
    sequentially producing frames at least by encoding a plurality of media streams from a plurality of media sources respectively;
    selecting frames of at least two different media sources among the plurality of media streams based on sizes of frames;
    configuring a unified packet by combining the selected frames of the at least two different media sources in consideration of time synchronization of the selected frames;
    wherein the configuring the unified packet comprises:
    configuring waiting time windows, based on production conditions of the frames produced from different media sources of the plurality of media sources,
    configuring frames having a size less than a threshold value, based on the configured waiting time windows, into the unified packet which is one unified packet;
    configuring frames having a size equal to or greater than the threshold value, among the frames produced from different media sources of the plurality of media sources, into independent packets, based on the waiting time windows; and
    transmitting the unified packet and the independent packets separately to an external electronic device via the communication module.

2. The method of claim 1, further comprising adjusting and scheduling the attributes of the frames sequentially produced such that production times of frames produced from the at least two different media sources of the plurality of media sources are synchronized and at least one of sizes and types of the frames produced from at least two different video sources of the plurality of media sources is produced differently at an identical time point.

3. The method of claim 1, further comprising identifying a transmission channel state to determine at least one of a value of the waiting time window for configuring the unified packet, the number of times the unified packet is produced, or the number of different media sources, and identifying the transmission channel state, based on at least one of a packet loss rate, an accumulated packet loss rate, a bandwidth, the number of packets to be transmitted, or a packet production time.

4. The method of claim 1, wherein the one unified packet is configured to include a field designating a payload size of each of the specified frames in a header.

5. An electronic device comprising:
   memory;
   at least one encoder;
   a communication module comprising communication circuitry; and
   at least one processor,
   wherein the memory stores instructions that, when executed by the at least one processor individually or collectively, cause the electronic device to:
   sequentially produce frames at least by encoding a plurality of media streams from a plurality of media sources respectively by the encoder;
   select frames of at least two different media sources among the plurality of media streams based on sizes of frames;
   configure a unified packet by combining the selected frames of the at least two different media sources in consideration of time synchronization of the selected frames;
   configure waiting time windows, based on production conditions of the frames produced from different media sources of the plurality of media sources;
   configure frames having a size less than a threshold value, based on the configured waiting time windows, into the unified packet which is one unified packet;
   configure frames having a size equal to or greater than the threshold value, among the frames produced from different media sources of the plurality of media sources, into independent packets, based on the waiting time windows; and
   transmit the unified packet and the independent packets separately to an external electronic device via the communication module.

6. The electronic device of claim 5, wherein the memory stores instructions that, when executed by the at least one processor individually or collectively, cause the electronic device to adjust and schedule the attributes of the frames sequentially produced by the encoder.

7. The electronic device of claim 6, wherein the memory stores instructions that, when executed by the at least one processor individually or collectively, cause the electronic device to synchronize production times of frames produced from the at least two different media sources of the plurality of media sources.

8. The electronic device of claim 6, wherein at least one of sizes and types of the frames produced from at least two different video sources of the plurality of media sources is produced differently at an identical time point.

9. The electronic device of claim 4, wherein the memory stores instructions that, when executed by the at least one processor individually or collectively, cause the electronic device to identify a transmission channel state and determine at least one of: a value of the waiting time window for configuring the unified packet, the number of times the unified packet is produced, or the number of different media sources.

10. The electronic device of claim 9, wherein the memory stores instructions that, when executed by the at least one processor individually or collectively, cause the electronic device to identify the transmission channel state, based on at least one of: a packet loss rate, an accumulated packet loss rate, a bandwidth, the number of packets to be transmitted, or a packet production time.

11. The electronic device of claim 5, wherein the memory stores instructions that, when executed by the at least one processor individually or collectively, cause the electronic device to control to transmit the unified packet, based on a real-time transport protocol (RTP).

12. The electronic device of claim 5, wherein the unified packet is configured to include a field designating a payload size of each of the specified frames in a header.

* * * * *